(12) United States Patent
Faramarzi et al.

(10) Patent No.: US 11,373,338 B2
(45) Date of Patent: Jun. 28, 2022

(54) IMAGE PADDING IN VIDEO-BASED POINT-CLOUD COMPRESSION CODEC

(71) Applicant: Samsung Electronics Co., Ltd., Suwon-si (KR)

(72) Inventors: Esmaeil Faramarzi, Richardson, TX (US); Madhukar Budagavi, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 16/732,159

(22) Filed: Dec. 31, 2019

(65) Prior Publication Data

US 2020/0219285 A1     Jul. 9, 2020

Related U.S. Application Data

(60) Provisional application No. 62/824,007, filed on Mar. 26, 2019, provisional application No. 62/822,460, (Continued)

(51) Int. Cl.
| | |
|---|---|
| *G06T 9/00* | (2006.01) |
| *G06T 3/40* | (2006.01) |
| *G06T 5/00* | (2006.01) |
| *H04L 65/60* | (2022.01) |
| *H04L 65/80* | (2022.01) |

(52) U.S. Cl.
CPC ............ *G06T 9/00* (2013.01); *G06T 3/40* (2013.01); *G06T 5/002* (2013.01); *H04L 65/607* (2013.01); *H04L 65/80* (2013.01); *G06T 2207/10028* (2013.01); *G06T 2207/20016* (2013.01); *G06T 2207/20024* (2013.01)

(58) Field of Classification Search
None
See application file for complete search history.

(56) References Cited

U.S. PATENT DOCUMENTS

| | | |
|---|---|---|
| 2010/0002948 A1 | 1/2010 | Gangwal et al. |
| 2012/0246166 A1 | 9/2012 | Krishnaswamy et al. |

(Continued)

OTHER PUBLICATIONS

Graziosi, "[PCC] TMC2 Optimal Texture Packing", ISO/IEC JTC1/SC29/WG11 MPEG2018/ m43681, Jul. 2018, 5 pages.

(Continued)

*Primary Examiner* — Randolph I Chu

(57) ABSTRACT

An encoding device and a method for point cloud encoding are disclosed. The method includes generating, for a 3D point cloud, an attribute frame and an occupancy map. The method also includes reducing a resolution of the frames over a number of sequential steps, until the frames are a predetermined size. After the frames are reduced to the predetermined size, the method includes increasing the resolution of the frames over the number of sequential steps while adding padding to modify at least some of the pixels in the attribute frame that do not represent points of the 3D point cloud. While the resolution of the attribute frame is incrementally increased, the method includes performing smoothing on the pixels in the attribute frame that do not represent the points of the 3D point cloud. The method additionally includes encoding the frames to generate a bitstream and then transmitting the bitstream.

20 Claims, 18 Drawing Sheets

Related U.S. Application Data filed on Mar. 22, 2019, provisional application No. 62/790,134, filed on Jan. 9, 2019.

(56) References Cited

U.S. PATENT DOCUMENTS

| | | |
|---|---|---|
| 2015/0348285 A1 | 12/2015 | Wang et al. |
| 2018/0268570 A1 | 9/2018 | Budagavi et al. |
| 2019/0087979 A1* | 3/2019 | Mammou ............... G06T 9/001 |
| 2019/0313110 A1* | 10/2019 | Mammou ............ H04N 19/597 |
| 2020/0221125 A1* | 7/2020 | Budagavi .............. G06T 3/0031 |
| 2021/0203989 A1* | 7/2021 | Wang ..................... H04N 19/13 |

OTHER PUBLICATIONS

Faramarzi et al., "[V-PCC] [New Proposal] Improved Texture Padding", ISO/IEC JTC1/SC29/WG11 MPEG2018/m46202, Jan. 2019, 4 pages.

Xu Yiling et al., "Introduction to Point Cloud Compression", ZTE Communications, vol. 16, No. 3, Aug. 24, 2018, 6 pages.

International Search Report dated May 1, 2020 in connection with International Patent Application No. PCT/KR2020/000398, 3 pages.

Written Opinion of the International Searching Authority dated May 1, 2020 in connection with International Patent Application No. PCT/KR2020/000398, 5 pages.

* cited by examiner

IMAGE PADDING IN VIDEO-BASED POINT-CLOUD COMPRESSION CODEC

CROSS-REFERENCE TO RELATED APPLICATION AND CLAIM OF PRIORITY

This application claims priority under 35 U.S.C. § 119(e) to U.S. Provisional Patent Application No. 62/790,134 filed on Jan. 9, 2019, U.S. Provisional Patent Application No. 62/822,460 filed on Mar. 22, 2019, and U.S. Provisional Patent Application No. 62/824,007 filed on Mar. 26, 2019. The above-identified provisional patent applications are hereby incorporated by reference in its entirety.

TECHNICAL FIELD

This disclosure relates generally to compressing and decompressing multimedia data. More specifically, this disclosure relates to an apparatus and a method for including padding within frames representing a point cloud.

BACKGROUND

Three hundred sixty degree (360°) video is emerging as a new way of experiencing immersive video due to the ready availability of powerful handheld devices such as smartphones. 360° video enables immersive "real life," "being there" experience for consumers by capturing the 360° view of the world. Users can interactively change their viewpoint and dynamically view any part of the captured scene or object they desire. Display and navigation sensors can track head movement of the user in real-time to determine the region of the 360° video that the user wants to view. Multimedia data that is three-dimensional (3D) in nature, such as point clouds can be used in the immersive environment.

Point clouds are a set of 3D points that represent an object's surface. Point clouds are common in a variety of applications such as gaming, 3D maps, visualizations, medical applications, augmented reality, virtual reality, autonomous driving, multi-view replay, 6DoF immersive media, to name a few. Point clouds, if uncompressed, generally require a large amount of bandwidth for transmission. Due to the large bitrate requirement, point clouds are often compressed prior to transmission. Compressing a 3D object such as a point cloud often requires specialized hardware. To avoid specialized hardware to compress a 3D point cloud, a 3D point cloud can be manipulated onto traditional two-dimensional (2D) frames and that can be compressed such that the compressed frames can be transmitted to another device without specialized hardware.

SUMMARY

This disclosure provides image padding in video-based point-cloud compression codec.

In one embodiment, an encoder for point cloud encoding is provided. The encoder includes a processor and a communication interface. The processor is configured to generate, for a three-dimensional (3D) point cloud, an attribute frame and an occupancy map frame. The attribute frame includes pixels that represent an attribute of the 3D point cloud and the occupancy map frame identifies which of the pixels in the attribute frame represent points of the 3D point cloud. The processor is also configured to reduce a resolution of the attribute frame and a resolution of the occupancy map frame over a number of sequential steps, until the attribute frame and the occupancy map frame are a predetermined size (such as a predetermined resolution). After the attribute frame and the occupancy map frame are reduced to the predetermined size, the processor is configured to increase the resolution of the attribute frame and the resolution of the occupancy map frame over the number of sequential steps while adding padding to modify at least some of the pixels in the attribute frame that do not represent points of the 3D point cloud. While the resolution of the attribute frame is incrementally increased, the processor is configured to perform smoothing on the pixels in the attribute frame that do not represent the points of the 3D point cloud. The processor is additionally configured to encode the attribute frame and the occupancy map frame to generate a bitstream. The communication interface operably coupled to the processor, the communication interface configured to transmit the bitstream.

In another embodiment, a method for point cloud decoding is provided. The method includes generating, for a three-dimensional (3D) point cloud, an attribute frame and an occupancy map. The attribute frame includes pixels that represent an attribute of the 3D point cloud and the occupancy map frame that identifies which of the pixels in the attribute frame represent points of the 3D point cloud. The method also includes reducing a resolution of the attribute frame and a resolution of the occupancy map frame over a number of sequential steps, until the attribute frame and the occupancy map frame are a predetermined size. After the attribute frame and the occupancy map frame are reduced to the predetermined size, the method includes increasing the resolution of the attribute frame and the resolution of the occupancy map frame over the number of sequential steps while adding padding to modify at least some of the pixels in the attribute frame that do not represent points of the 3D point cloud. While the resolution of the attribute frame is incrementally increased, the method includes performing smoothing on the pixels in the attribute frame that do not represent the points of the 3D point cloud. The method additionally includes encoding the attribute frame and the occupancy map frame to generate a bitstream. The method further includes transmitting the bitstream.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
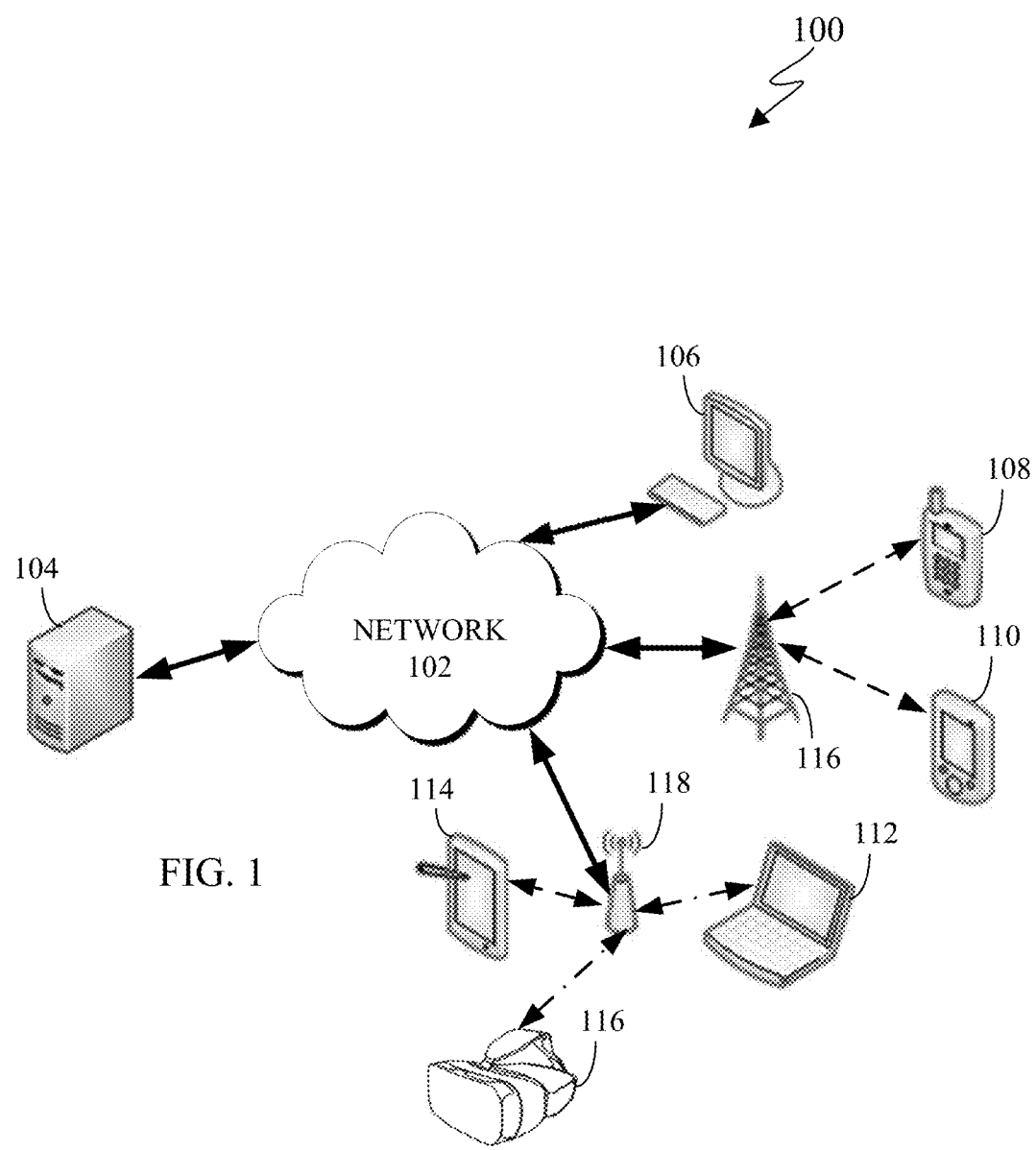
FIG. 1 illustrates an example communication system in accordance with an embodiment of this disclosure.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

Augmented reality (AR) is an interactive experience of a real world environment where objects that reside in the real-world environment are augmented with virtual objects, virtual information, or both. Virtual reality (VR) is a rendered version of a visual scene, where the entire scene is computer generated. In certain embodiments, AR and VR include both visual and audio experiences. A visual rendering is designed to mimic the visual stimuli, and if available audio sensory stimuli, of the real world as naturally as possible to an observer or user as the user moves within the limits defined by the application or the AR or VR scene. For example, VR places a user into immersive worlds that respond to the head movements of a user. At the video level, VR is achieved by providing a video experience that covers as much of the field of view (FOV) as possible together with the synchronization of the viewing angle of the rendered video with the head movements.

Many different types of devices are able to provide the immersive experience associated with AR or VR. One example device is a head-mounted display (HMD). A HMD is a device that enables a user to view the VR scene and adjust the displayed content based on movements of the head of the user. A HMD represent one of many types of devices that provide AR and VR experiences to a user. Typically, a HMD relies either on a dedicated screen that is integrated into a device and connected with an external computer (tethered) or on a device, such as a smartphone, that is inserted into the HMD (untethered). The first approach utilizes one or more lightweight screens and benefits from a high computing capacity. In contrast, the smartphone-based systems utilize higher mobility and can be less expensive to produce. In both instances, the video experience generated is the same. It is noted that as used herein, the term "user" may denote a human or another device (such as an artificial intelligent electronic device) using the electronic device.

A point cloud is a virtual representation of an object in three dimensions. For example, a point cloud is a collection of points in 3D space, and each point is positioned in a particular position within 3D space and includes one or more attributes, such as color. A point cloud can be similar to a virtual object in a VR or AR environment. A point mesh is another type of a virtual representation of an object in a VR or AR environment. A point cloud or a point mesh can be an object, multiple objects, a virtual scene (which includes multiple objects), and the like. Point clouds are commonly used in a variety of applications, including gaming, 3D mapping, visualization, medicine, AR, VR, autonomous driving, multi-view replay, 6 degrees of freedom immersive media, to name a few.

Point clouds represent volumetric visual data. Point clouds consist of multiple 3D points positioned in 3D space. Each point in a 3D point cloud includes an attribute such as a geometric position, represented by 3-tuple (X,Y,Z) coordinate values. When each point is identified by the three coordinates, a precise location in 3D environment or space is identified. The location in a 3D environment or space of each point can be relative to an origin, other points of the point cloud, or a combination thereof. The origin is a location where the X, Y, and Z axis intersect. In certain embodiments, the points are positioned on the external surface of the object. In certain embodiments, the points are positioned throughout the internal structure and external surfaces of the object. In addition to the geometry component, each point in the point cloud can also include one or more attributes, such as color, texture, reflectance, intensity, surface normal, and the like. In some embodiments, a single point of a 3D point cloud can have multiple attributes. For example, a single point can include a geometric position (such as a location of the point in 3D space), as well as one or more attributes that specifies various aspects of the point such as the color or texture of the point, the reflectiveness of the point the intensity of the point, the surface normal of the point, and the like. In some applications, point clouds can also be used to approximate light field data in which, each point includes multiple view-dependent, color information (R, G, B triplets).

A single point cloud can include billions of points, with each point associated with a geometric position and one or more attributes. A geometric position and each additional attribute that is associated with a point occupy a certain number of bits. For example, a geometric position of a single point in a point cloud can consume thirty bits. For instance, if each geometric position of a single point is defined with an X value, a Y value, and a Z value, then each coordinate (the X, the Y, and the Z) uses ten bits, totaling the thirty bits. Similarly, an attribute that specifies the color of a single point can consume twenty-four bits. For instance, if a color component of a single point is defined based on a Red value, Green value, and Blue value, then each color component (Red, Green, and Blue) uses eight bits, totaling the twenty-four bits. As a result, a single point with a ten bit geometric attribute data, per coordinate, and an eight bit color attribute data, per color value, occupies fifty-four bits. Each additional attribute increases the bits required for a single point. If a frame includes one million points, the number of bits per frame is fifty-four million bits (fifty-four bits per point times one million points per frame). If the frame rate is thirty frames per second and undergoes no compression, then 1.62 gigabytes per second (fifty-four million bits per frame times thirty frames per second) are to be transmitted from one electronic device to another in order for the second device to display the point cloud. Therefore, transmitting an uncompressed point cloud from one electronic device to another uses significant bandwidth due to the size and complexity of the data associated with a single point cloud. As a result, the point cloud is compressed prior to the transmission.

Embodiments of the present disclosure take into consideration that compressing a point cloud is necessary to expedite and improve transmission of the point cloud from one device (such as a source device) to another device (such as a display device) due to the bandwidth necessary to transmit the point cloud. Certain dedicated hardware components can be used to meet the real-time demands or reduce delays or lags in the transmitting and rendering a 3D point cloud; however such hardware components are often expensive. Additionally, many video codecs are not able to encode and decode 3D video content, such as a point cloud. Compressing and decompressing a point cloud by leveraging existing 2D video codecs enables the encoding and decoding of a point cloud to be widely available without the need for new or specialized hardware. According to embodiments of the present disclosure, leveraging existing video codecs can be used to compress and reconstruct a point cloud, when the point cloud is converted from a 3D state to a 2D state. In certain embodiments, the conversion of a point cloud includes projecting the clusters of points of the 3D point cloud onto 2D frames by creating patches that represent the point cloud. Thereafter, video codecs such as HEVC, AVC, VP9, VP8, VVC, and the like can be used to compress the 2D frames representing the 3D point cloud similar to a 2D video.

Figure 4A:
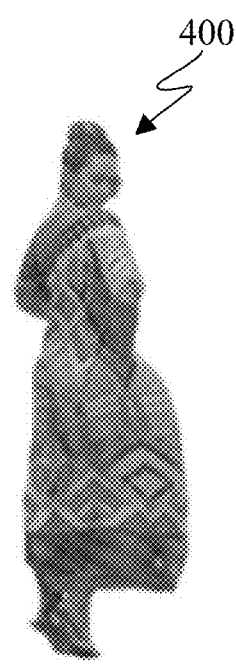
FIG. 4A illustrates an example 3D point cloud in accordance with an embodiment of this disclosure.
Figure 4B:
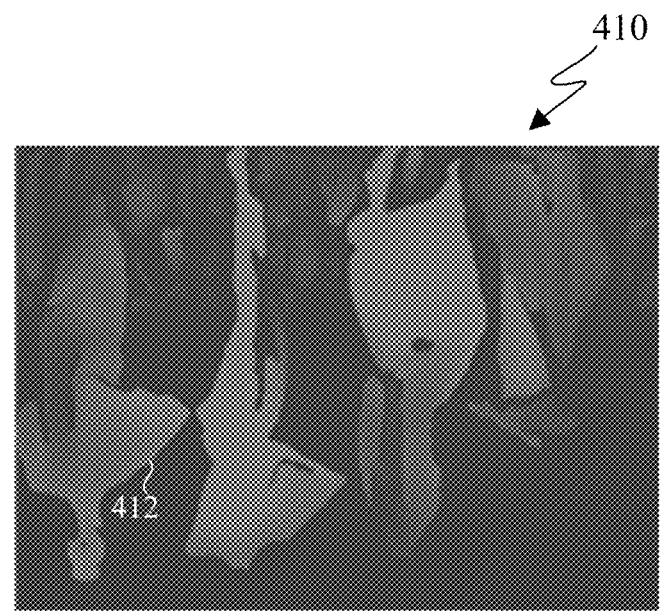
FIGS. 4B, and 4C illustrate 2D frames that represent the 3D point cloud in accordance with an embodiment of this disclosure.
Figure 4C:
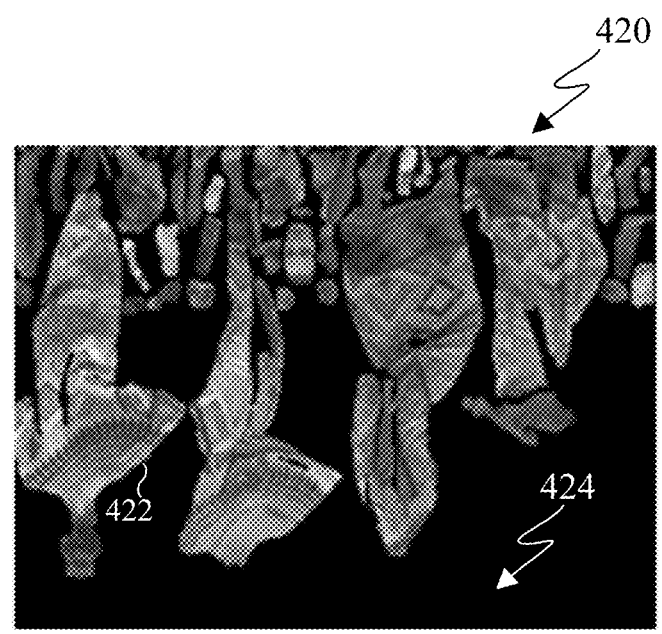

Converting the point cloud includes projecting the point cloud to generate multiple patches and packing the patches onto one or more 2D frames, such that the frames can be compressed, and then transmitted to a display device. The frames can represent projections at different layers of the point cloud. The frames can also represent different attributes of the point cloud, such as one frame includes values representing geometry positions of the points and another frame includes values representing color information associated with each of the points. A decoder reconstructs the patches within the 2D frames into the 3D point cloud, such that the point cloud can be rendered, displayed, and then viewed by a user. When the point cloud is deconstructed to fit on multiple 2D frames and compressed, the frames can be transmitted using less bandwidth than used to transmit the original point cloud. FIGS. 4A-4C, which are described in greater detail below, illustrate a 3D point cloud that is projected onto 2D frames by creating patches of the point cloud and two attributes.

Embodiments of the present disclosure provide systems and methods for converting a point cloud into a 2D state that can be transmitted and then reconstructed into the point cloud. In certain embodiments, a point cloud is deconstructed into multiple patches, and multiple frames are generated that include the patches. In certain embodiments, a frame includes patches of the same attributes. The points of the 3D point cloud that are represented in one patch in one frame correspond to the same points that are represented in another patch in a second frame. In other embodiments, the patches on one frame represent multiple attributes associated with the points of the point cloud, such as a geometric position of the points in 3D space and color.

An encoder projects the 3D point cloud onto the multiple 2D frames and generates a bitstream. The encoder or another device then transmits the bitstream to different device(s). The frames can be compressed by leveraging various video compression codecs, image compression codecs, or both. A decoder receives the bitstream, decompresses the bitstream into the frames, and reconstructs the point cloud based on the information within the frames. After the point cloud is reconstructed, the 3D point cloud can be rendered and displayed for a user to observe. In certain embodiments, frames representing different attributes (including the geometric positions of the points) are encoded and decoded separately. In other embodiments, frames representing different attributes (including the geometric positions of the points) are encoded and decoded together.

During projection the encoder decomposes the point cloud into a set of patches by clustering the points. The geometry and attribute information of these patches are packed into geometry video frames and attribute video frames, respectively. The geometry video frames are used to encode the geometry information, and the corresponding attribute video frames are used to encode the various attributes of the point cloud, such as color, texture, reflectance, and the like. Each pixel within a patch in the geometry video frame corresponds to a point in 3D space. The two transverse coordinates (with respect to the projection plane) of a 3D point corresponds to the column and row indices in the geometry video frame (u,v) plus a transverse-offset which determines the location of the entire patch within the video frame. The depth of the 3D point is encoded as the value of the pixel in the video frame plus a depth-offset for the patch. The depth of the 3D point cloud depends on whether the projection of the 3D point cloud is taken from the XY, YZ, or XZ coordinates.

As discussed in great detail below, when a frame is generated an occupancy map is also generated. Generally, the occupancy map indicates, for each pixel within a frame, whether the pixel is a valid pixel or an invalid pixel. For example, if a pixel in occupancy map at coordinate (u,v) is valid, then the corresponding pixel in a geometry frame or attribute frame at the coordinate (u,v) is valid. If the pixel in occupancy map at coordinate (u,v) is invalid, then the decoder skips the corresponding pixel in a geometry frame or attribute frame at the coordinate (u,v). In certain embodiments, the occupancy map at a position (u,v) can be one or zero. When the value of a pixel at position (u,v) of the occupancy map is one indicates that a pixel at (u,v) of an attribute frame and the geometry frame is valid. In contrast, when the value of a pixel at position (u,v) of the occupancy map is zero indicates that a pixel at (u,v) of the attribute frame and the geometry frame is invalid.

Embodiments of the present disclosure provide systems and methods for improving the compression of a point cloud by reducing the bitrate. Reducing the bitrate can improve the overall performance of a point cloud compression codec. According to embodiments of the present disclosure, architecture and methods for including padding in a frame representing a 3D point cloud are provided. The areas between projected patches of the 3D point cloud are filled using a padding mechanism to reduce the number of sharp edges in the projected video frame. Reducing the number of sharp edges in the projected video frame reduces the compression bitrate.

FIG. 1 illustrates an example communication system 100 in accordance with an embodiment of this disclosure. The embodiment of the communication system 100 shown in FIG. 1 is for illustration only. Other embodiments of the communication system 100 can be used without departing from the scope of this disclosure.

The communication system 100 includes a network 102 that facilitates communication between various components in the communication system 100. For example, the network 102 can communicate IP packets, frame relay frames, Asynchronous Transfer Mode (ATM) cells, or other information between network addresses. The network 102 includes one or more local area networks (LANs), metropolitan area networks (MANs), wide area networks (WANs), all or a portion of a global network such as the Internet, or any other communication system or systems at one or more locations.

In this example, the network 102 facilitates communications between a server 104 and various client devices 106-116. The client devices 106-116 may be, for example, a smartphone, a tablet computer, a laptop, a personal computer, a wearable device, a HMD, or the like. The server 104 can represent one or more servers. Each server 104 includes any suitable computing or processing device that can provide computing services for one or more client devices, such as the client devices 106-116. Each server 104 could, for example, include one or more processing devices, one or more memories storing instructions and data, and one or more network interfaces facilitating communication over the network 102. As described in more detail below, the server 104 can transmit a compressed bitstream, representing a point cloud, to one or more display devices, such as a client device 106-116. In certain embodiments, each server 104 can include an encoder.

Each client device 106-116 represents any suitable computing or processing device that interacts with at least one server (such as the server 104) or other computing device(s) over the network 102. The client devices 106-116 include a desktop computer 106, a mobile telephone or mobile device 108 (such as a smartphone), a PDA 110, a laptop computer 112, a tablet computer 114, and a HMD 116. However, any other or additional client devices could be used in the communication system 100. Smartphones represent a class of mobile devices 108 that are handheld devices with mobile operating systems and integrated mobile broadband cellular network connections for voice, short message service (SMS), and Internet data communications. The HMD 116 can display a 360° scene including one or more 3D point clouds. In certain embodiments, any of the client devices 106-116 can include an encoder, decoder, or both. For example, the mobile device 108 can record a video and then encode the video enabling the video to be transmitted to one of the client devices 106-116. In another example, the laptop computer 112 can be used to generate a virtual 3D point cloud, which is then encoded and transmitted to one of the client devices 106-116.

In this example, some client devices 108-116 communicate indirectly with the network 102. For example, the mobile device 108 and PDA 110 communicate via one or more base stations 118, such as cellular base stations or eNodeB s (eNB s). Also, the laptop computer 112, the tablet computer 114, and the HMD 116 communicate via one or more wireless access points 120, such as IEEE 802.11 wireless access points. Note that these are for illustration only and that each client device 106-116 could communicate directly with the network 102 or indirectly with the network 102 via any suitable intermediate device(s) or network(s). In certain embodiments, the server 104 or any client device 106-116 can be used to compress a point cloud, generate a bitstream that represents the point cloud, and transmit the bitstream to another client device such as any client device 106-116.

In certain embodiments, any of the client devices 106-114 transmit information securely and efficiently to another device, such as, for example, the server 104. Also, any of the client devices 106-116 can trigger the information transmission between itself and the server 104. Any of the client devices 106-114 can function as a VR display when attached to a headset via brackets, and function similar to HMD 116. For example, the mobile device 108 when attached to a bracket system and worn over the eyes of a user can function similarly as the HMD 116. The mobile device 108 (or any other client device 106-116) can trigger the information transmission between itself and the server 104.

In certain embodiments, any of the client devices 106-116 or the server 104 can create a 3D point cloud, compress a 3D point cloud, transmit a 3D point cloud, receive a 3D point cloud, render a 3D point cloud, or a combination thereof. For example, the server 104 receives a 3D point cloud, decompose the 3D point cloud to fit on 2D frames, compressed the frames to generate a bitstream that can be transmitted to a storage device, such as an information repository, or one or more of the client devices 106-116. For another example, one of the client devices 106-116 can receive a 3D point cloud, decompose the 3D point cloud to fit on 2D frames, compressed the frames to generate a bitstream that can be transmitted to a storage device, such as an information repository, another one of the client devices 106-116, or to the server 104.

Although FIG. 1 illustrates one example of a communication system 100, various changes can be made to FIG. 1. For example, the communication system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
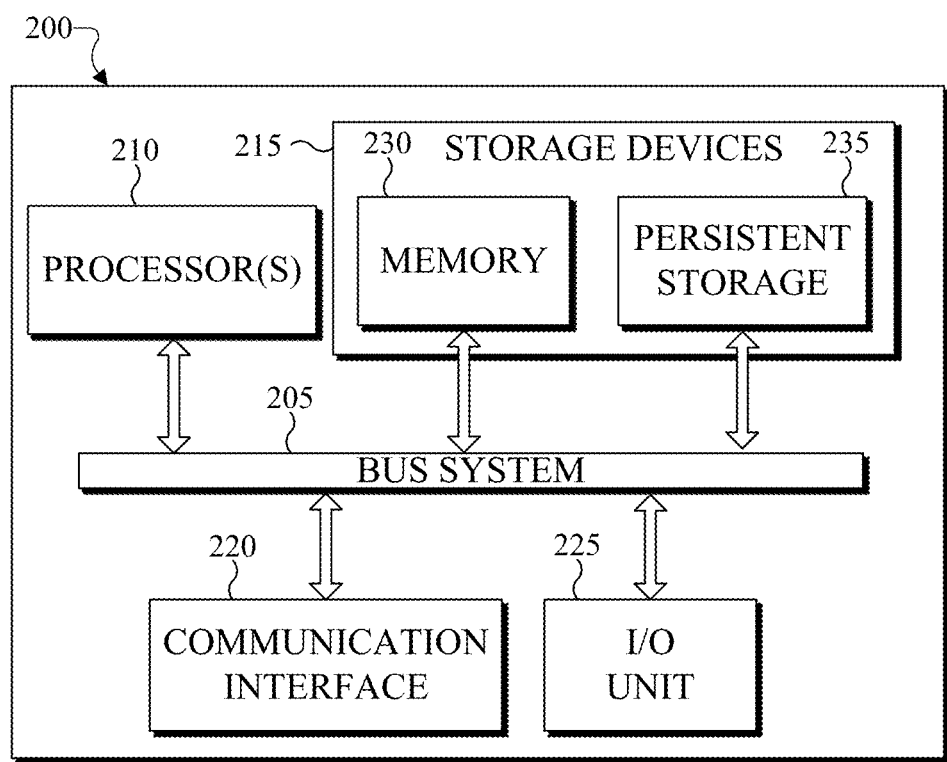
FIGS. 2 and 3 illustrate example electronic devices in accordance with an embodiment of this disclosure.
Figure 3:
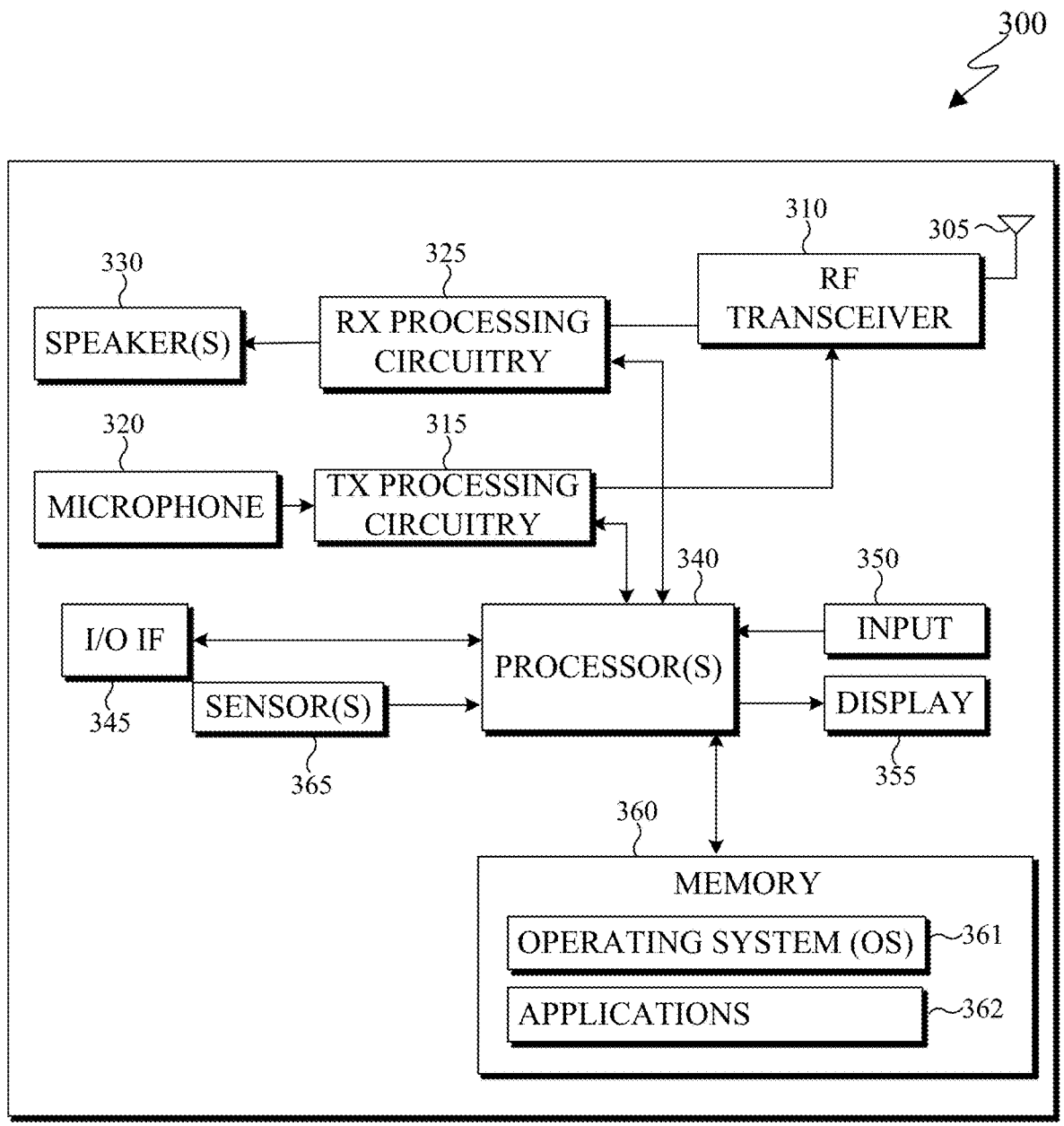

FIGS. 2 and 3 illustrate example electronic devices in accordance with an embodiment of this disclosure. In particular, FIG. 2 illustrates an example server 200, and the server 200 could represent the server 104 in FIG. 1. The server 200 can represent one or more encoders, decoders, local servers, remote servers, clustered computers, and components that act as a single pool of seamless resources, a cloud-based server, and the like. The server 200 can be accessed by one or more of the client devices 106-116 of FIG. 1 or another server.

The server 200 can represent one or more local servers, one or more compression servers, or one or more encoding servers, such as an encoder. In certain embodiments, the encoder can perform decoding. As shown in FIG. 2, the server 200 includes a bus system 205 that supports communication between at least one processing device (such as a processor 210), at least one storage device 215, at least one communications interface 220, and at least one input/output (I/O) unit 225.

The processor 210 executes instructions that can be stored in a memory 230. The processor 210 can include any suitable number(s) and type(s) of processors or other devices in any suitable arrangement. Example types of processors 210 include microprocessors, microcontrollers, digital signal processors, field programmable gate arrays, application specific integrated circuits, and discrete circuitry. In certain embodiments, the processor 210 can encode a 3D point cloud stored within the storage devices 215. In certain embodiments, encoding a 3D point cloud also decodes the 3D point cloud to ensure that when the point cloud is reconstructed at a decoder, the reconstructed 3D point cloud matches the original 3D point cloud.

The memory 230 and a persistent storage 235 are examples of storage devices 215 that represent any structure(s) capable of storing and facilitating retrieval of information (such as data, program code, or other suitable information on a temporary or permanent basis). The memory 230 can represent a random access memory or any other suitable volatile or non-volatile storage device(s). For example, the instructions stored in the memory 230 can include instructions for decomposing a point cloud into patches, instructions for packing the patches on 2D frames, instructions for compressing the 2D frames, as well as instructions for encoding 2D frames in a certain order in order to generate a bitstream. The instructions stored in the memory 230 can also include instructions for rendering a 360° scene, as viewed through a VR headset, such as HMD 116 of FIG. 1. The persistent storage 235 can contain one or more components or devices supporting longer-term storage of data, such as a read only memory, hard drive, Flash memory, or optical disc.

The communications interface 220 supports communications with other systems or devices. For example, the communications interface 220 could include a network interface card or a wireless transceiver facilitating communications over the network 102 of FIG. 1. The communications interface 220 can support communications through any suitable physical or wireless communication link(s). For example, the communications interface 220 can transmit a bitstream containing a 3D point cloud to another device such as one of the client devices 106-116.

The I/O unit 225 allows for input and output of data. For example, the I/O unit 225 can provide a connection for user input through a keyboard, mouse, keypad, touchscreen, or other suitable input device. The I/O unit 225 can also send output to a display, printer, or other suitable output device. Note, however, that the I/O unit 225 can be omitted, such as when I/O interactions with the server 200 occur via a network connection.

In certain embodiments, the server 200 can receive a 3D point cloud via the communication interface 220 or access a 3D point cloud stored in one of the storage devices 215. The server 200 can also generate a bitstream representing the 3D point cloud. When encoding media content, such as a point cloud, the server 200 can project the point cloud into multiple patches. For example, a cluster of points of the point cloud can be grouped together to generate a patch. A patch can represent a single attribute of the point cloud, such as geometry, color, and the like. Patches that represent the same attribute can be packed into individual 2D frames, respectively. FIGS. 4A-4D, which are described in greater detail below, illustrate a 3D point cloud that is represented by patches on different frames.

For example, the geometry coordinates are segmented into patches and packed into 2D frames. The 2D frames can be video frames. The areas between the projected patches are filled in by padding which reduces the number of sharp edges in the projected frames. The geometry video is then compressed using a 2D video codec such as HEVC. To encode the color attribute, the frames representing the geometry are decoded to reconstruct the 3D coordinates. Thereafter, the reconstructed geometry coordinates are smoothed, and the corresponding color values are interpolated from the color values of input coordinates. The generated colors are then packed into 2D frames and encoded. A binary occupancy map is generated to indicate the location of projected points in the 2D frames is also created and encoded. The compressed frames and occupancy map are multiplexed together with auxiliary information that is used for patch creation to make the output bitstream. For example, during the encoding process additional content such as metadata, flags, occupancy maps, and the like can be included in the bitstream as auxiliary information.

Note that while FIG. 2 is described as representing the server 104 of FIG. 1, the same or similar structure could be used in one or more of the various client devices 106-116.

For example, a desktop computer 106 or a laptop computer 112 could have the same or similar structure as that shown in FIG. 2.

FIG. 3 illustrates an example electronic device 300, and the electronic device 300 could represent one or more of the client devices 106-116 in FIG. 1. The electronic device 300 can be a mobile communication device, such as, for example, a mobile station, a subscriber station, a wireless terminal, a desktop computer (similar to the desktop computer 106 of FIG. 1), a portable electronic device (similar to the mobile device 108, the PDA 110, the laptop computer 112, the tablet computer 114, or the HMD 116 of FIG. 1), and the like. In certain embodiments, one or more of the client devices 106-116 of FIG. 1 can include the same or similar configuration as the electronic device 300. In certain embodiments, the electronic device 300 is an encoder, a decoder, or both. For example, the electronic device 300 is usable with data transfer, image or video compression, image or video decompression, encoding, decoding, and media rendering applications.

As shown in FIG. 3, the electronic device 300 includes an antenna 305, a radio-frequency (RF) transceiver 310, transmit (TX) processing circuitry 315, a microphone 320, and receive (RX) processing circuitry 325. The RF transceiver 310 can include, for example, a RF transceiver, a BLUETOOTH transceiver, a WI-FI transceiver, a ZIGBEE transceiver, an infrared transceiver, and various other wireless communication signals. The electronic device 300 also includes a speaker 330, a processor 340, an input/output (I/O) interface (IF) 345, an input 350, a display 355, a memory 360, and a sensor(s) 365. The memory 360 includes an operating system (OS) 361, and one or more applications 362.

The RF transceiver 310 receives, from the antenna 305, an incoming RF signal transmitted from an access point (such as a base station, WI-FI router, or BLUETOOTH device) or other device of the network 102 (such as a WI-FI, BLUETOOTH, cellular, 5G, LTE, LTE-A, WiMAX, or any other type of wireless network). The RF transceiver 310 down-converts the incoming RF signal to generate an intermediate frequency or baseband signal. The intermediate frequency or baseband signal is sent to the RX processing circuitry 325 that generates a processed baseband signal by filtering, decoding, and/or digitizing the baseband or intermediate frequency signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data from the processor 340. The outgoing baseband data can include web data, e-mail, or interactive video game data. The TX processing circuitry 315 encodes, multiplexes, and/or digitizes the outgoing baseband data to generate a processed baseband or intermediate frequency signal. The RF transceiver 310 receives the outgoing processed baseband or intermediate frequency signal from the TX processing circuitry 315 and up-converts the baseband or intermediate frequency signal to an RF signal that is transmitted via the antenna 305.

The processor 340 can include one or more processors or other processing devices. The processor 340 can execute instructions that are stored in the memory 360, such as the OS 361 in order to control the overall operation of the electronic device 300. For example, the processor 340 could control the reception of forward channel signals and the transmission of reverse channel signals by the RF transceiver 310, the RX processing circuitry 325, and the TX processing circuitry 315 in accordance with well-known principles. The processor 340 can include any suitable number(s) and type(s) of processors or other devices in any suitable arrangement. For example, in certain embodiments, the processor 340 includes at least one microprocessor or microcontroller. Example types of processor 340 include microprocessors, microcontrollers, digital signal processors, field programmable gate arrays, application specific integrated circuits, and discrete circuitry.

The processor 340 is also capable of executing other processes and programs resident in the memory 360, such as operations that receive and store data. The processor 340 can move data into or out of the memory 360 as required by an executing process. In certain embodiments, the processor 340 is configured to execute the one or more applications 362 based on the OS 361 or in response to signals received from external source(s) or an operator. Example applications 362 can include an encoder, a decoder, a VR or AR application, a camera application (for still images and videos), a video phone call application, an email client, a social media client, a SMS messaging client, a virtual assistant, and the like. In certain embodiments, the processor 340 is configured to receive and transmit media content.

The processor 340 is also coupled to the I/O interface 345 that provides the electronic device 300 with the ability to connect to other devices, such as client devices 106-114. The I/O interface 345 is the communication path between these accessories and the processor 340.

The processor 340 is also coupled to the input 350 and the display 355. The operator of the electronic device 300 can use the input 350 to enter data or inputs into the electronic device 300. The input 350 can be a keyboard, touchscreen, mouse, track ball, voice input, or other device capable of acting as a user interface to allow a user in interact with the electronic device 300. For example, the input 350 can include voice recognition processing, thereby allowing a user to input a voice command. In another example, the input 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme. The input 350 can be associated with the sensor(s) 365 and/or a camera by providing additional input to the processor 340. In certain embodiments, the sensor 365 includes one or more inertial measurement units (IMUs) (such as accelerometers, gyroscope, and magnetometer), motion sensors, optical sensors, cameras, pressure sensors, heart rate sensors, altimeter, and the like. The input 350 can also include a control circuit. In the capacitive scheme, the input 350 can recognize touch or proximity.

The display 355 can be a liquid crystal display (LCD), light-emitting diode (LED) display, organic LED (OLED), active matrix OLED (AMOLED), or other display capable of rendering text and/or graphics, such as from websites, videos, games, images, and the like. The display 355 can be sized to fit within a HMD. The display 355 can be a singular display screen or multiple display screens capable of creating a stereoscopic display. In certain embodiments, the display 355 is a heads-up display (HUD). The display 355 can display 3D objects, such as a 3D point cloud.

The memory 360 is coupled to the processor 340. Part of the memory 360 could include a RAM, and another part of the memory 360 could include a Flash memory or other ROM. The memory 360 can include persistent storage (not shown) that represents any structure(s) capable of storing and facilitating retrieval of information (such as data, program code, and/or other suitable information). The memory 360 can contain one or more components or devices supporting longer-term storage of data, such as a read only memory, hard drive, Flash memory, or optical disc. The memory 360 also can contain media content. The media content can include various types of media such as images, videos, three-dimensional content, VR content, AR content, 3D point clouds, and the like.

The electronic device 300 further includes one or more sensors 365 that can meter a physical quantity or detect an activation state of the electronic device 300 and convert metered or detected information into an electrical signal. For example, the sensor 365 can include one or more buttons for touch input, a camera, a gesture sensor, an IMU sensors (such as a gyroscope or gyro sensor and an accelerometer), an eye tracking sensor, an air pressure sensor, a magnetic sensor or magnetometer, a grip sensor, a proximity sensor, a color sensor, a bio-physical sensor, a temperature/humidity sensor, an illumination sensor, an Ultraviolet (UV) sensor, an Electromyography (EMG) sensor, an Electroencephalogram (EEG) sensor, an Electrocardiogram (ECG) sensor, an IR sensor, an ultrasound sensor, an iris sensor, a fingerprint sensor, a color sensor (such as a Red Green Blue (RGB) sensor), and the like. The sensor 365 can further include control circuits for controlling any of the sensors included therein.

As discussed in greater detail below, one or more of these sensor(s) 365 may be used to control a user interface (UI), detect UI inputs, determine the orientation and facing the direction of the user for three-dimensional content display identification, and the like. Any of these sensor(s) 365 may be located within the electronic device 300, within a secondary device operably connected to the electronic device 300, within a headset configured to hold the electronic device 300, or in a singular device where the electronic device 300 includes a headset.

The electronic device 300 can create media content such as generate a 3D point cloud or capture (or record) content through a camera. The electronic device 300 can encode the media content to generate a bitstream (similar to the server 200, described above), such that the bitstream can be transmitted directly to another electronic device or indirectly such as through the network 102 of FIG. 1. The electronic device 300 can receive a bitstream directly from another electronic device or indirectly such as through the network 102 of FIG. 1.

For example, when encoding media content, such as a point cloud, the electronic device 300 can project the point cloud into multiple patches. For example, a cluster of points of the point cloud can be grouped together to generate a patch. A patch can represent a single attribute of the point cloud, such as geometry, color, and the like. Patches that represent the same attribute can be packed into individual 2D frames, respectively. FIGS. 4A-4D, which are described in greater detail below, illustrate a 3D point cloud that is represented by patches on different frames.

When decoding media content included in a bitstream that represents a 3D point cloud, the electronic device 300 decodes the received bitstream into frames. For example, the electronic device 300 can demultiplex the received bitstream into multiple video bitstreams, occupancy map bitstream, and auxiliary information. The video bitstream represents the 2D frames. The video and occupancy map bitstreams are decoded and combined with the auxiliary information to reconstruct the output point cloud. For example, the decoded video stream can include geometry frames and color frames.

The geometry frames include pixels indicating geographic coordinates of points of the point cloud in 3D space, while the color frames include pixels indicating the RGB color of each geometric point in 3D space. The auxiliary information can include one or more flags, or quantization parameter size, or any combination thereof. After reconstructing the 3D point cloud, the electronic device 300 can render the 3D point cloud in three dimensions via the display 355.

Although FIGS. 2 and 3 illustrate examples of electronic devices, various changes can be made to FIGS. 2 and 3. For example, various components in FIGS. 2 and 3 could be combined, further subdivided, or omitted and additional components could be added according to particular needs. As a particular example, the processor 340 could be divided into multiple processors, such as one or more central processing units (CPUs) and one or more graphics processing units (GPUs). In addition, as with computing and communication, electronic devices and servers can come in a wide variety of configurations, and FIGS. 2 and 3 do not limit this disclosure to any particular electronic device or server. In yet another example, the encoding and decoding of a 3D point cloud can be performed by the server 200, the electronic device 300, or both the server 200 and the electronic device 300.

Figure 4D:
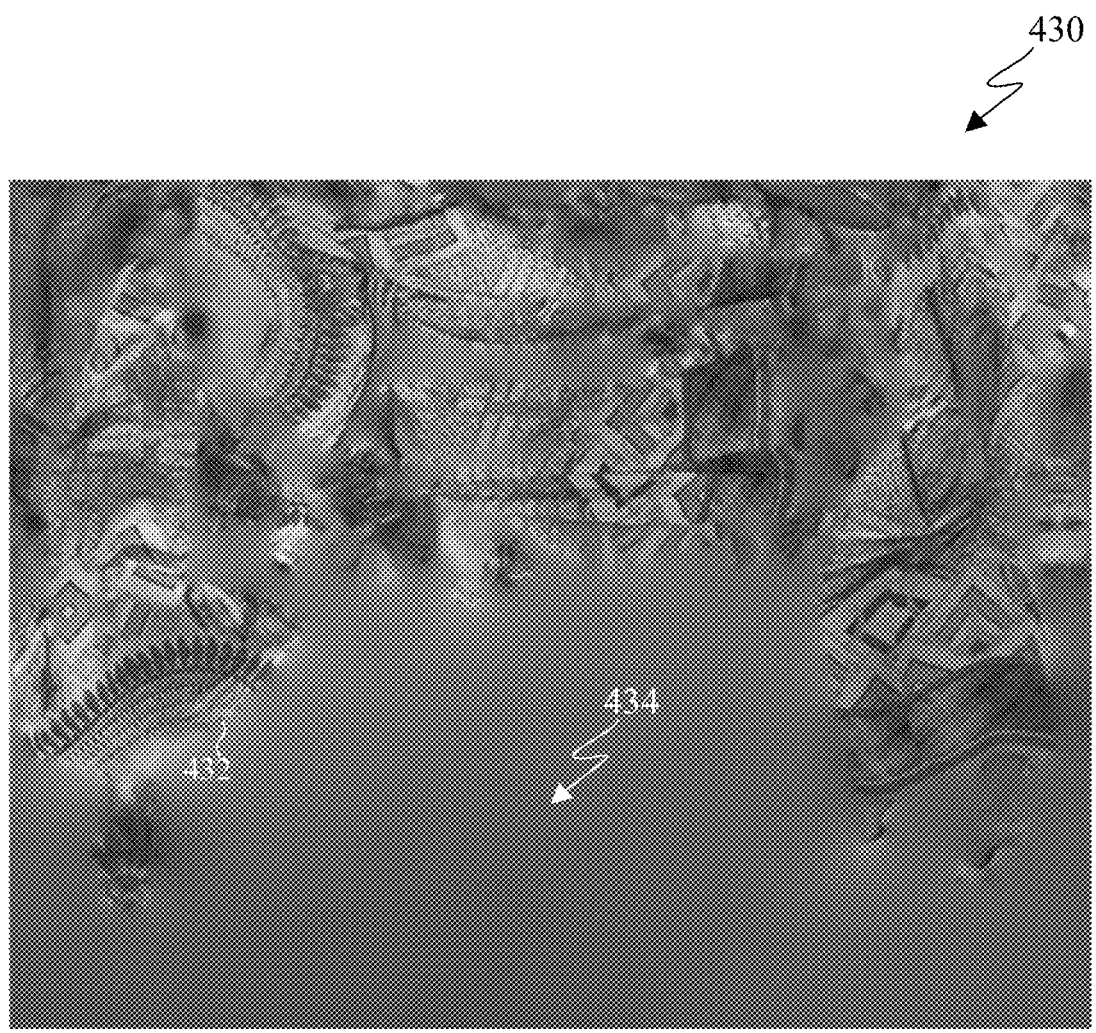
FIG. 4D illustrates an example 2D frame that includes padding and represents the 3D point cloud in accordance with an embodiment of this disclosure.

FIGS. 4A, 4B, 4C, and 4D illustrate an example 3D point cloud and 2D frames that represent the 3D point cloud in accordance with an embodiment of this disclosure. In particular, FIG. 4A illustrates a 3D point cloud 400, and FIGS. 4B and 4C each illustrate a 2D frame that includes patches representing the 3D point cloud 400. The FIG. 4B illustrates an example 2D frame 410 that represents the geometric position of the points of the 3D point cloud 400. The FIG. 4C illustrates an example 2D frame 420 that represents an attribute (such as color) that is associated with the points of the 3D point cloud 400. The FIG. 4D illustrates an example 2D frame 430 that includes padding and represents a color attribute associated with the points of the 3D point cloud 400. It is noted that FIGS. 4C and 4D are similar as both illustrate an attribute frame depicting color of the points, but FIG. 4D includes padding as compared to FIG. 4C. The embodiment of FIGS. 4A, 4B, 4C, and 4D are for illustration only and other embodiments could be used without departing from the scope of this disclosure.

The 3D point cloud 400 is a set of data points in 3D space. Each point of the 3D point cloud 400 includes a geometric position that provides the structure of the 3D point cloud and one or more attributes that provide information about each point such as color, reflectiveness, material, and the like.

Generally, the attributes of the 3D point cloud 400 are clustered and projected on to different planes. The attributes of the 3D point cloud 400 are projected using predefined criteria such as normal direction, distance to the projected frames, contiguity, and the like. The different plans can be the XY plane, the YZ plane, or the XZ plane. Each of the clusters corresponds to a patch when projected onto a plane.

The frame 410 depicts multiple patches (such as a patch 412) representing geometry of the points of the 3D point cloud 400. In particular, the patches within the frame 410 depict the depth values of the 3D point cloud 400 from different projection planes. In certain embodiments, the level of illumination of each pixel in the frame 410 indicates the distance that the represented point is from the projection plane.

The frame 420, depicts multiple patches (such as a patch 422) representing the color attribute of the 3D point cloud 400. For example, each pixel in the frame 420 includes color values indicating the color of each of the points of the 3D point cloud 400. That is a pixel can include a red value, a green value and a blue value.

The patches (such as the patches 412 and 422) are sorted and packed into a different 2D frame. For example, the patch 412 (representing geometric positions of a cluster of points of the 3D point cloud 400) is packed into a frame 410. Similarly, the patch 422 (representing a color component of a cluster of points of the 3D point cloud 400) is packed into the frame 420.

Each pixel in the frame 420 corresponds to a pixel at the same location in the frame 410. For example, a mapping is generated between each pixel in the frame 410 and the frame 420. The location of the patches within the 2D frames 410 and 420 can be similar for a single position of the 3D point cloud. Similarly, a coordinate (u,v) of a pixel within the frame 410 corresponds to a similar pixel at the same coordinate (u,v) in the frame 420. As the 3D point cloud 400 changes, new frames can be generated with different patches based on the new position the 3D point cloud.

The frame 430 is similar to the frame 420, as both frames represent a color attribute of the 3D point cloud 400. For example, a similar mapping relates the pixels of the frame 430 to corresponding pixels within the frame 410. For another example, the frame 430 includes a patch 432 which is similar to the patch 422 of the frame 420 and corresponds to the patch 412 of the frame 410. That is, the patch 432 represents the color attributes for the points represented in the patch 412.

A difference between the frame 420 and the frame 430 is with respect to the padding. As illustrated, the frame 420 does not include padding 424 while the frame 430 includes padding 434. Embodiments of the present disclosure, fills the area between the patches, referred to as inter-patch space. The padding 434 reduces the bitrate of the compressed videos. For example, the number of sharp edges between patches in the projected frame 430 is less than the number of sharp edges between patches in the projected frame 420. The padding 434 reduces a sharp transition from the boundary of one of the patches to empty space within the frame. Reducing the sharp transition from the boundary of one of the patches to an area of the frame that does not represent the points of the point cloud improves the compression performance of the encoder. The process of adding the padding 434 is described in greater detail below in FIGS. 5B and 6A-G.

The frames, such the frame 410 and the frame 430 are then encoded with a video codec such as HEVC, AVC, VP9, VP8, VVC, AVC, and the like. A decoder can receive the frames 410 and 430 and reconstructs the geometry of the 3D point cloud from the frame 410 and colors the geometry of the point cloud based on the frame 430 in order to generate the reconstructed point cloud.

Although FIGS. 4A, 4B, 4C, and 4D illustrate example point cloud and 2D frames representing a point cloud, various changes can be made to FIGS. 4A, 4B, 4C, and 4D. For example, a point cloud or mesh can represent a single object, whereas in other embodiments, a point cloud or mesh can represent multiple objects, scenery (such as a landscape), a virtual object in AR, and the like. In another example, the patches included in the 2D frames can represent other attributes, such as luminance, material, and the like. FIGS. 4A, 4B, 4C, and 4D do not limit this disclosure to any particular 3D object(s) and 2D frames representing the 3D object(s).

Figure 5A:
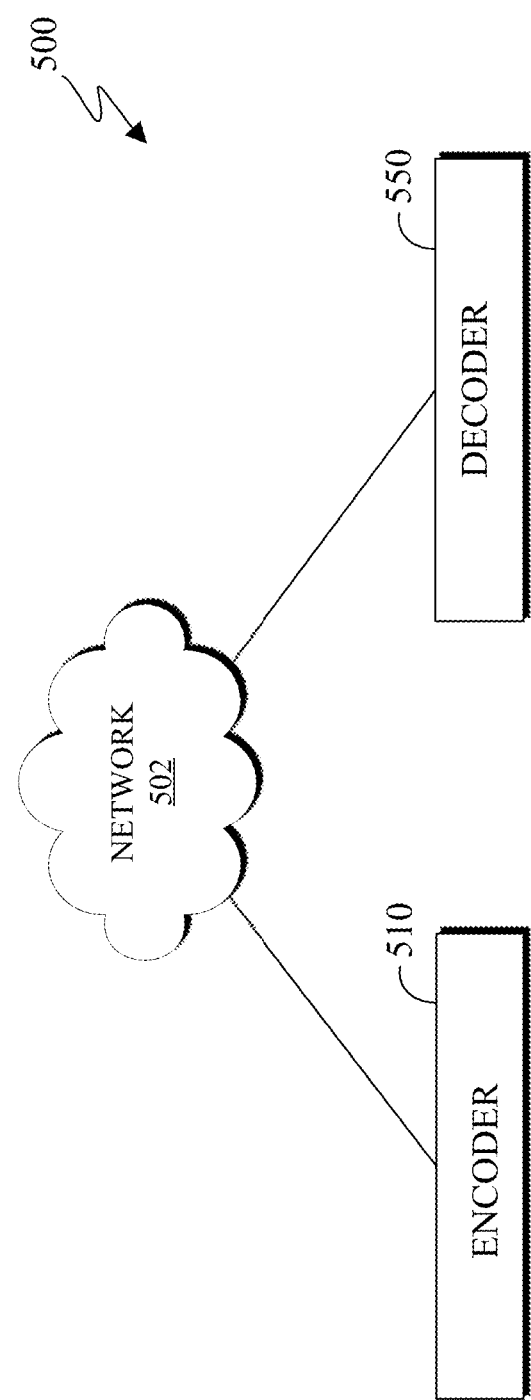
FIG. 5A illustrates a block diagram of an example environment-architecture in accordance with an embodiment of this disclosure.
Figure 5B:
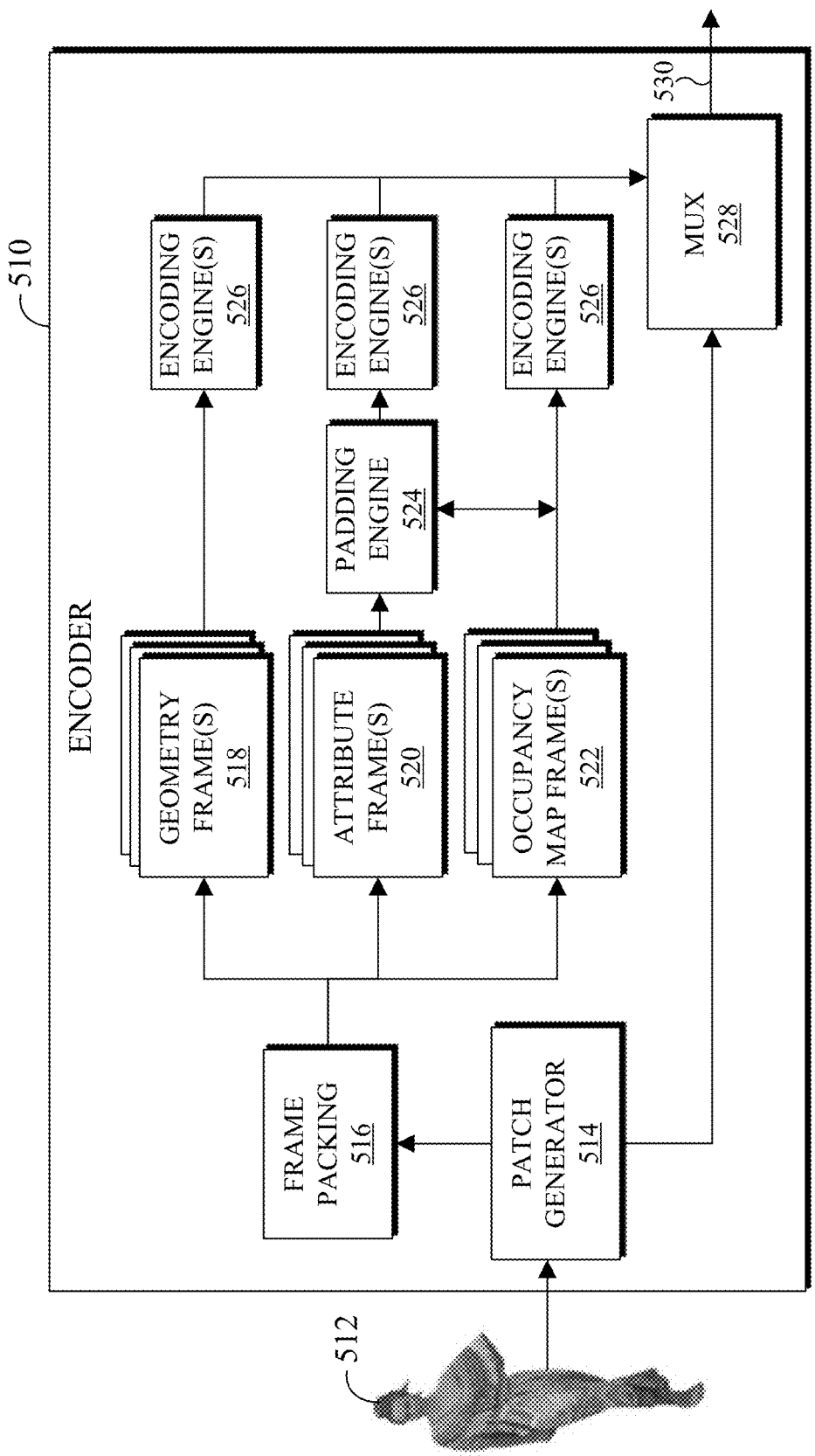
FIG. 5B illustrates an example block diagram of an encoder in accordance with an embodiment of this disclosure.
Figure 5C:
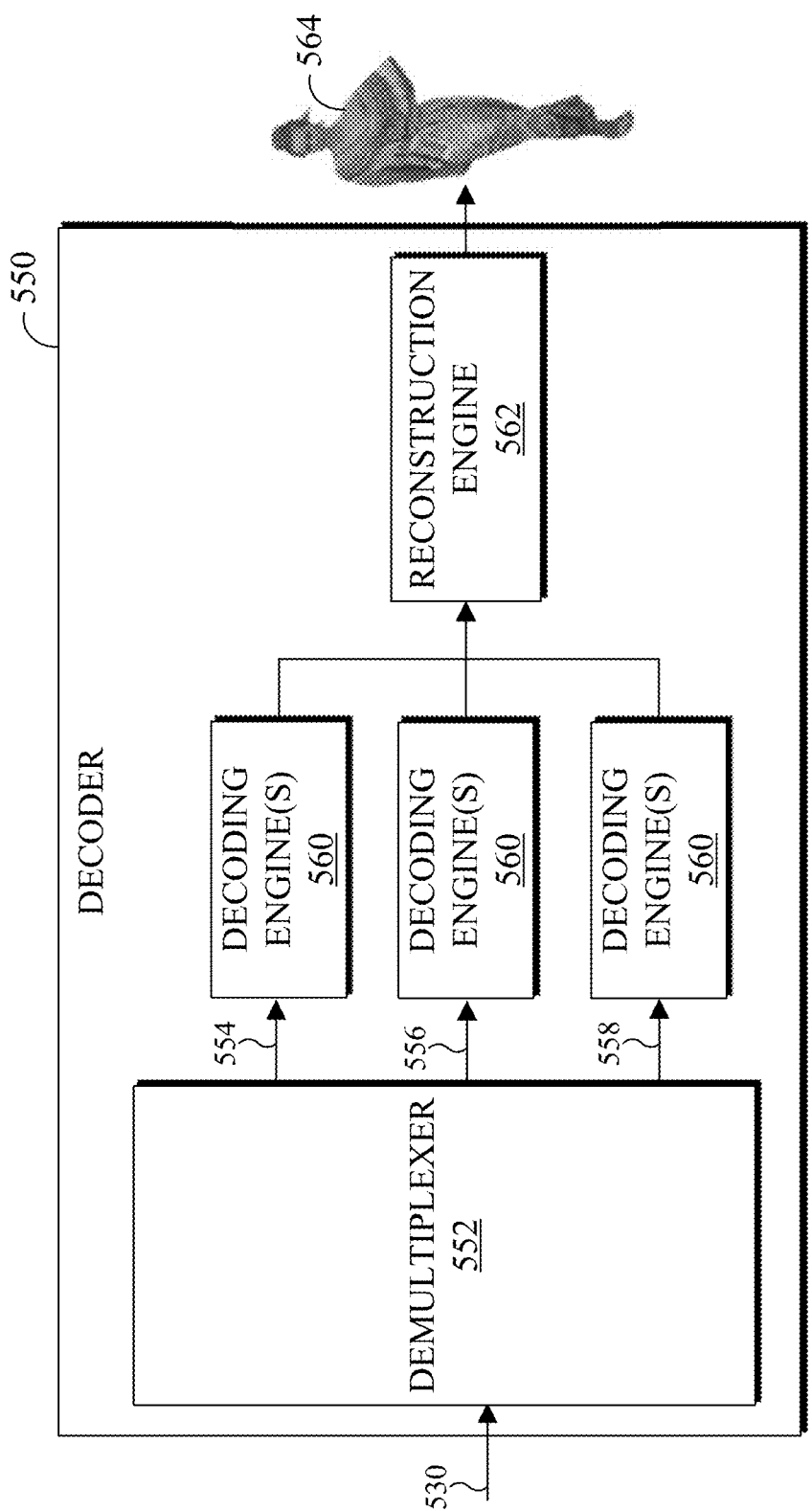
FIG. 5C illustrates an example block diagram of a decoder in accordance with an embodiment of this disclosure.

FIGS. 5A, 5B, and 5C illustrate block diagrams in accordance with an embodiment of this disclosure. In particular, FIG. 5A illustrates a block diagram of an example environment-architecture 500 in accordance with an embodiment of this disclosure. FIG. 5B illustrates an example block diagram of the encoder 510 of FIG. 5A in accordance with an embodiment of this disclosure. FIG. 5C illustrates an example block diagram of the decoder 550 of FIG. 5A in accordance with an embodiment of this disclosure. The embodiments of FIGS. 5A, 5B, and 5C are for illustration only. Other embodiments can be used without departing from the scope of this disclosure.

As shown in FIG. 5A, the example environment-architecture 500 includes an encoder 510 and a decoder 550 in communication over a network 502. The network 502 can be the same as or similar to the network 102 of FIG. 1. In certain embodiments, the network 502 represents a "cloud" of computers interconnected by one or more networks, where the network is a computing system utilizing clustered computers and components that act as a single pool of seamless resources when accessed. Also, in certain embodiments, the network 502 is connected with one or more servers (such as the server 104 of FIG. 1, the server 200), one or more electronic devices (such as the client devices 106-116 of FIG. 1, the electronic device 300), the encoder 510, and the decoder 550. Further, in certain embodiments, the network 502 can be connected to an information repository (not shown) that contains a VR and AR media content that can be encoded by the encoder 510, decoded by the decoder 550, or rendered and displayed on an electronic device.

In certain embodiments, the encoder 510 and the decoder 550 can represent the server 104, one of the client devices 106-116 of FIG. 1, the server 200 of FIG. 2, the electronic device 300 of FIG. 3, or another suitable device. In certain embodiments, the encoder 510 and the decoder 550 can be a "cloud" of computers interconnected by one or more networks, where each is a computing system utilizing clustered computers and components to act as a single pool of seamless resources when accessed through the network 502. In some embodiments, a portion of the components included in the encoder 510 or the decoder 550 can be included in different devices, such as multiple servers 104 or 200, multiple client devices 106-116, or other combination of different devices. In certain embodiments, the encoder 510 is operably connected to an electronic device or a server while the decoder 550 is operably connected to an electronic device. In certain embodiments, the encoder 510 and the decoder 550 are the same device or operably connected to the same device.

The encoder 510 is described with more below in FIG. 5B. Generally, the encoder 510 receives 3D media content, such as a point cloud, from a device such as a server (similar to the server 104 of FIG. 1, the server 200 of FIG. 2), an information repository (such as a database), or one of the client devices 106-116. In certain embodiments, the encoder 510 can receive media content from multiple cameras and stitch the content together to generate a 3D scene that includes one or more point clouds.

In certain embodiments, the encoder 510 projects a point cloud into two dimensions which create patches that represent the projection. The encoder 510 clusters points of a point cloud into groups which are projected onto different planes such as an XY plane, an YZ plane, and an XZ plane. Each cluster of points is represented by a patch when projected onto a plane. The encoder 510 can project a point cloud into two dimensions. It is noted that a point of the 3D point cloud is located in 3D space based on a (X,Y,Z) coordinate value. When the point is projected onto a 2D frame the pixel, representing the projected point, is denoted by the column and row index in the frame indicated by the coordinate (u,v). Additionally, 'u' and 'v' can range from zero to the number of rows or columns in the depth image, respectively.

The encoder 510 packs the patches representing the point cloud onto 2D video frames. Each of the 2D video frames represents a particular attribute, such as one set of frames can represent geometry and another set of frames can represent an attribute. It should be noted that additional frames can be generated based on more layers as well as each additionally defined attribute.

The encoder 510 adds additional pixels in the inter-patch space to reduce the harsh transition from the boundary of one patch to the empty unfilled area between two patches. For example, in a frame representing color, additional pixels are added to the inter-patch space, where the color of the additional pixels are blended from one patch to an adjacent patch, creating a smooth transition between patches. Even though additional pixels are added to the frame representing color, the decoder 550, using the occupancy map, disregards the additionally added pixels when reconstructing the point cloud, since the added pixels do not correspond to the points of a 3D point cloud.

The encoder 510 transmits frames representing the point cloud as a compressed bitstream. The bitstream can be transmitted to an information repository (such as a database), an electronic device that includes a decoder (such as the decoder 550), or the decoder 550 itself through the network 502. The encoder 510 is described in greater detail below in FIG. 5B.

The decoder 550 can receive a bitstream that represents media content, such as a point cloud. The bitstreams can include data representing a 3D point cloud. In certain embodiments, the decoder 550 can decode the bitstream and generate multiple frames such as geometry and attribute. The decoder 550 reconstructs the point cloud from multiple frames. The decoder 550 is described with more below in FIG. 5C.

FIG. 5B illustrates the encoder 510 that receives a 3D point cloud 512 and generates a bitstream 530. The bitstream 530 includes data representing a received 3D point cloud 512. The bitstream 530 can include multiple bitstreams and can be transmitted via the network 502 of FIG. 5A to another device, such as the decoder 550 or an information repository. The encoder 510 includes a patch generator 514, a frame packing 516, various frames (such as one or more geometry frames 518, one or more attribute frames 520, and one or more occupancy map frames 522), a padding engine 524 one or more encoding engines 526, and a multiplexer 528.

The 3D point cloud 512 can be stored in memory (not shown) or received from another electronic device (not shown). The 3D point cloud 512 can be a single 3D object, or a grouping of 3D objects. The 3D point cloud 512 can be a stationary object or an object which moves.

The patch generator 514 generates patches by taking projections of the 3D point cloud 512. In certain embodiments, the patch generator 514 splits the geometry attribute and each attribute of each point of the 3D point cloud 512. The patch generator 514 can use two or more projection planes, to cluster the points of the 3D point cloud 512 to generate the patches. The geometry attribute and each attribute are eventually packed into respective geometry frames 518 or the attribute frames 520, by the frame packing 516.

For each input point cloud, such as the 3D point cloud 512, the geometry attribute and one or more attributes (such as color) are clustered using one or more criteria. The criteria include a normal direction, a distance to projected frames, contiguity, and the like. After the points are clustered, the geometry attribute and a corresponding attribute for each point are projected onto planes, such as the XY plane, the YZ plane, or the XZ plane.

When projected, each cluster of points of the 3D point cloud 512 appears as a patch. Each patch (also referred to as a regular patch) represents a particular attribute of the point cloud. For example, a single cluster of points can be represented as a patch on multiple frames, where each patch represents a different attribute. It is noted that patches representing different attributes of the same cluster of points include a correspondence or a mapping, such a pixel in one patch corresponds to the same pixel in another patch.

In certain embodiments, multiple frames of the same 3D point cloud using two or more projection planes can be generated. In certain embodiments, the patch generator 514 splits geometry aspects of each point of the 3D point cloud 512 and the color components of each point of the 3D point cloud 512, which are placed on respective geometry frames 518 and the attribute frames 520 that correspond to color.

The frame packing 516 sorts and packs the patches (both the geometry and color patches) into respective frames, such as the geometry frames 518 and the attribute frames 520. As illustrated in FIGS. 4B and 4C, the frame packing 516 organizes the attributes and places the patches within corresponding frames, such as the patch 412 representing geometry is included in the frame 410 and the patch 422 representing an attribute such as color is included in the frame 420. The frame packing 516 also generates one or more occupancy map frames 522 based on the placement of the patches within the geometry frames 518 and the attribute frames 520.

The geometry frames 518 include pixels representing the geometry values of the 3D point cloud 512. The geometry frames 518 represent the geographic location of each point of the 3D point cloud 512. The attribute frames 520 include pixels representing values of a particular attribute such as color of the 3D point cloud 512. Color represents a single aspect of each point of the 3D point cloud 512. For example, if the geometry frame 518 indicates where each point of the 3D point cloud 512 is in 3D space, then the corresponding attribute frame 520 indicates the color of each corresponding point. Additional frames can be created that represent the other attributes. For example, if another set of frames is generated, such as reflectance frames (not shown), then the corresponding reflectance frame indicates the level of reflectance of each corresponding point represented by the geometry frame 518. In certain embodiments, each geometry frame 518 has at least one corresponding attribute frame 520.

The occupancy map frames 522 represent occupancy maps that indicate the valid pixels in the frames (such as the geometry frames 518 and the attribute frames 520). For example, the occupancy map frames 522 indicate whether each point in a frame is a valid pixel or an invalid pixel. The valid pixels correspond to pixels that represent points of the 3D point cloud 512. The invalid pixels are pixels within a frame that do not represent a point of the 3D point cloud 512 and correspond to inter-patch spaces. In certain embodiments, one of the occupancy map frames 522 can correspond to the both a geometry frame 518 and an attribute frame 520.

For example, when the frame packing 516 generates the occupancy map frames 522, the occupancy map frames include predefined values, such as zero or one, for each pixel. When the value of a pixel in the occupancy map at position (u,v) is zero, then the pixel at (u,v) in the geometry frame 518 and the pixel at (u,v) in the attribute frame 520 are invalid. When the value of a pixel in the occupancy map at position (u,v) is one, then the pixel at (u,v) in the geometry frame 518 and the pixel at (u,v) in the attribute frame 520 are valid.

The padding engine 524 fills the inter-patch spaces of the attribute frames 520 with pixels. Another padding engine (or the padding engine 524), not shown, can fill the inter-patch spaces of the geometry frames 518 with pixels. The padding engine 524 fills the inter-patch spaces of the attribute frames 520 using the corresponding occupancy map frame 522.

To add the padding, the padding engine 524 incrementally down samples the resolution of both the attribute frame 520 and the occupancy map frame 522. That is, the padding engine 524 performs a bottom-up traversal to incrementally reduce the resolution of the attribute frame 520 and the occupancy map frame 522. For example, the padding engine 524 incrementally reduces the resolution of the attribute frame 520 and the occupancy map frame 522. Each step that the resolution of the attribute frame 520 and the occupancy map frame 522 is reduced, corresponds to new levels of details (LoD). In certain embodiments, at each incremental step that the resolution of the frames is reduced, the padding engine 524 can apply a filter to smooth the results of the down sampling. The resolution of the attribute frame 520 and the occupancy map frame 522 is decreased multiple times until both frames are at a predetermined size. In certain embodiments, the predetermined size is a 4×4 resolution. FIGS. 6D and 6E, describe the process of reducing the resolution of the attribute frame 520 and the occupancy map frame 522 over a number of sequential steps.

During each incremental step, the resolution of the attribute frame 520 and the occupancy map frame 522 is reduced. Generally a block combines the pixels within itself to generate the next LoD. The pixels within the block are modified to create a single pixel. For example, the block can be 2×2, where the pixels within the 2×2 block modified to create a single pixel. In other examples, the block can be any size, (square or rectangular) such as a 3×3, 2×4, 4×4, and the like. In certain embodiments, the size of the block changes at each subsequent step (generate of a new LoD). For example, the first iteration of down sampling can use a first block size, while the second iteration of down sampling can use a second block size, and so on. The size of the block is less than the size of the frames.

In certain embodiments, the padding engine 524 sets the size of the block by which the resolution of the attribute frame 520 and the occupancy map frame 522 is reduced based on a predetermined number of steps to reduce the frame size. For example, the padding engine 524 sets the block size such that the frames are incrementally down sampled the predetermined number of times until the resolution corresponds to the predetermined size. In certain embodiments, the size of the block is based on (i) the resolution of the frames, (ii) the predetermined resolution of the smallest size of the frames, and (iii) a predetermined number of steps to reduce the frames. In certain embodiments, the size of the block is based on (i) the resolution of the frame at the current LoD and (ii) the predetermined resolution of the next LoD.

Once the resolution of the attribute frame 520 and the occupancy map frame 522 reach the predetermined size, the padding engine 524 up samples both the attribute frame 520 and the occupancy map frame 522. That is, the padding engine 524 performs a top-down traversal to iteratively increase the resolution of the attribute frame 520 and the occupancy map frame 522 while filling the inter-patch space. The padding engine 524 incrementally increases the resolution of the attribute frame 520 and the occupancy map frame 522 to the original size. For example, the padding engine 524 incrementally increases the resolution of the attribute frame 520 and the occupancy map frame 522 which creates multiple LoDs.

During each incremental step that the resolution of the attribute frame 520 and the occupancy map frame 522 is increased the padding engine 524 fills the inter-patch area of the attribute frame 520. For example, after each incremental step that the resolution of the attribute frame 520 and the occupancy map frame 522 is increased, the padding engine 524 performs multiple iterations of smoothing, to the pixels in the attribute frame 520. The padding engine 524 identifies the pixels in the attribute frame 520 at each LoD to smooth based on the occupancy map frame 522 at the same LoD. FIGS. 6F and 6G, describe the process of increasing the resolution of the attribute frame 520 and the occupancy map frame 522 over a number of sequential steps while filling the inter-patch area and smoothing the filled inter-patch area over a number of iterations.

Each step that the resolution of the attribute frame 520 and the occupancy map frame 522 is increased corresponds to a particular LoD. During each incremental step, the resolution of the attribute frame 520 and the occupancy map frame 522 is increased. In certain embodiments, the sizes of the attribute frame 520 and the occupancy map frame 522 are increased at the same ratio between the LoDs. For example, if a block size of 2×2 was used to down sample the frames from a first LoD to a second LoD, then the same block size (2×2) is used to up sample the frames from the second LoD to the first LoD. As such, the same number of steps that are used to down sample are also used to up sample the frames.

At each step that the resolution of the attribute frame 520 and the occupancy map frame 522 is increased, the padding engine 524 smoothes the attribute frame 520. That is, at each LoD, the padding engine 524 smoothes the attribute frame 520. In certain embodiments, at each LoD the padding engine 524 performs multiple iterations of smoothing. For example, a first iteration of smoothing at a given LoD is based on the values of the pixels in attribute frame 520. A subsequent iteration of smoothing is based on the values of the pixels in the attribute frame 520 after the previous iteration of smoothing. For instance, for three iterations of smoothing, the first iteration is based on the values of the pixels in the attribute frame 520 after the resolution is increased. The second iteration of smoothing is based on the values of the pixels in the attribute frame 520 after the first iteration of smoothing. The third iteration of smoothing is based on the values of the pixels in the attribute frame 520 after the second iteration of smoothing. Thereafter, the padding engine 524 up samples the attribute frame 520 based on the third iteration of smoothing.

In certain embodiments, the number of iterations that the padding engine 524 performs smoothing increases at each subsequent LoD. For example, the padding engine 524 performs smoothing four times when then attribute frame 520 is the predetermined size (the smallest size). At each larger LoD the padding engine 524 increases the number of iterations that smoothing is performed. In certain embodiments, the padding engine 524 does not perform smoothing over sixteen different intervals.

In certain embodiments, the number of iterations that the padding engine 524 performs smoothing is based on a residual error. For example, after performing an iteration of smoothing, the padding engine 524 identifies the residual error between the attribute frame 520 prior to the iteration of smoothing and the attribute frame 520 after the iteration of smoothing is performed. The padding engine 524 compares the residual error to a threshold. Based on the comparison, the padding engine 524 determines to perform another iteration of smoothing or increase the resolution of the attribute frame 520 by up sampling. For instance, as more iterations of smoothing are performed with respect to the texture frame at a single LoD, the difference between a previous iteration of smoothing and the current iteration of smoothing decreases. When the difference between a previous iteration of smoothing and the current iteration of smoothing decreases to a certain level, as indicated by comparing the residual error to a threshold, additional iterations of smoothing will not increase the amount of padding.

The padding engine 524 performs the smoothing using a filter. For example, the padding engine 524 uses a 3×3 filter to smooth the pixels in the attribute frame 520. In certain embodiments, the padding engine 524 can also change the weights assigned to a filter change at each subsequent LoD. In certain embodiments, the padding engine 524 uses an 8-tap filter for smoothing. FIG. 7B, illustrates an example, 8-tap filter.

In addition to performing multiple iterations of the smoothing at each LoD, the padding engine 524 can also change the size of the filter that performs the smoothing. In certain embodiments, the filter size increases at each subsequent (larger) LoD. For example, a 3×3 filter is used at the predetermined size and the filter size increases incrementally at each larger LoD.

After the padding engine 524 increases the resolution of the attribute frame 520 to its original size, the attribute frame 520, the geometry frames 518, and the occupancy map frame 522 are encoded using the encoding engines 526. In certain embodiments, the padding engine 524 also generates padding in the geometry frames 518, using corresponding occupancy map frames.

The encoding engines 526 encode the geometry frames 518, the attribute frames 520, and the occupancy map frames 522. In certain embodiments, the frames (such as the geometry frames 518, the attribute frames 520, and the occupancy map frames 522) are encoded by independent encoders. For example, one encoding engine 526 can encode the geometry frames 518, another encoding engine 526 can encode the attribute frames 520, and yet another encoding engine 526 can encode the occupancy map frames 522. In certain embodiments, the encoding engines 526 can be configured to support an 8-bit, a 10-bit, a 12-bit, a 14-bit, or a 16-bit, precision of data. The encoding engine 526 can be a video or image codec such as HEVC, AVC, VP9, VP8, VVC, and the like to compress the 2D frames representing the 3D point cloud.

The multiplexer 528 combines the multiple frames (such as the geometry frames 518, the attribute frames 520, and the occupancy map frames 522) which are encoded, to create a bitstream 530.

FIG. 5C illustrates the decoder 550 that includes a demultiplexer 552, one or more decoding engines 560, and a reconstruction engine 562. The decoder 550 receives a bitstream 530, such as the bitstream that was generated by the encoder 510. The demultiplexer 552 separates bitstream 530 into one or more bitstreams representing the different frames. For example, the demultiplexer 552 separates various streams of data such as the geometry frame information 554 (originally the geometry frames 518 of FIG. 5B), attribute frame information 556 (originally the attribute frames 520 of FIG. 5B), and the occupancy map information 558 (originally the occupancy map frames 522 of FIG. 5B).

The decoding engines 560 decode the geometry frame information 554 to generate the geometry frames. The decoding engines 560 decode the attribute frame information 556 to generate the attribute frames. Similarly, the decoding engines 560 decode the occupancy map information 558 to generate the occupancy map frames. In certain embodiments, a single decoding engine 560 decodes the geometry frame information 554, the attribute frame information 556, and the occupancy map information 558.

After the geometry frame information 554, the attribute frame information 556, and the occupancy map information 558 are decoded, the reconstruction engine 562 generates a reconstructed point cloud 564 by reconstructing the decoded geometry frame information 554, the decoded attribute frame information 556, and the decoded occupancy map information 558. The reconstructed point cloud 564 is similar to the 3D point cloud 512.

Although FIGS. 5A-5C illustrates one example of transmitting a point cloud, various changes may be made to FIG. 5A-5C. For example, additional components can be included in the encoder 510 and the decoder 550.

Figure 6A:
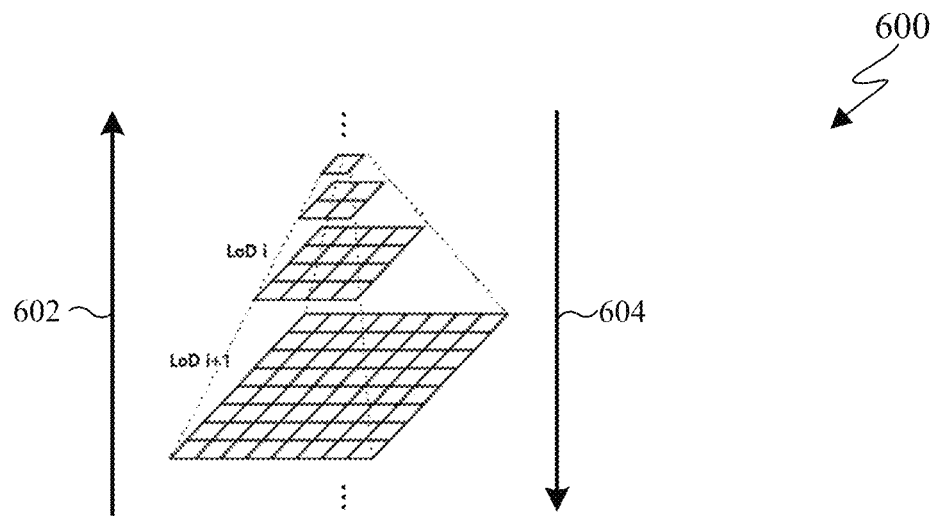
FIGS. 6A and 6B illustrate example diagrams depicting a process for adding padding to a 2D frame representing a 3D point cloud by down sampling and up sampling the 2D frame in accordance with an embodiment of this disclosure.
Figure 6B:
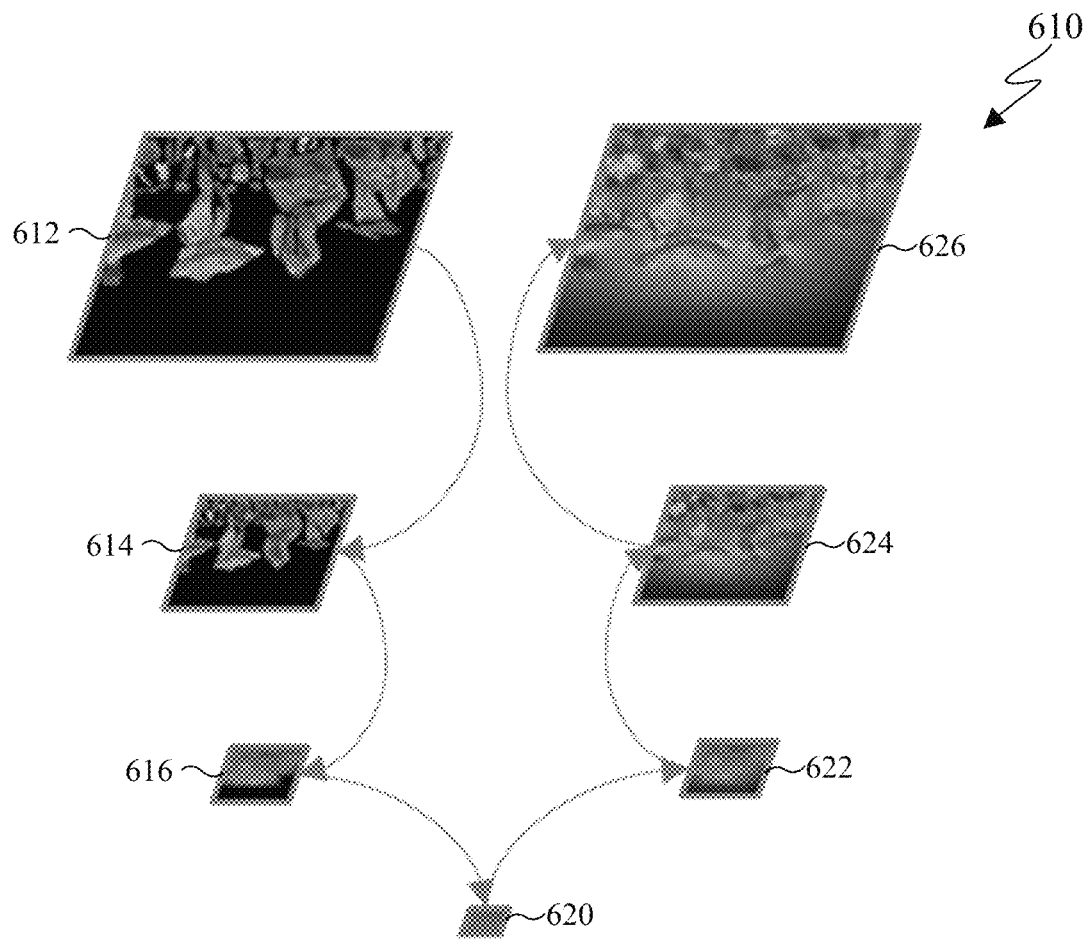
Figure 6C:
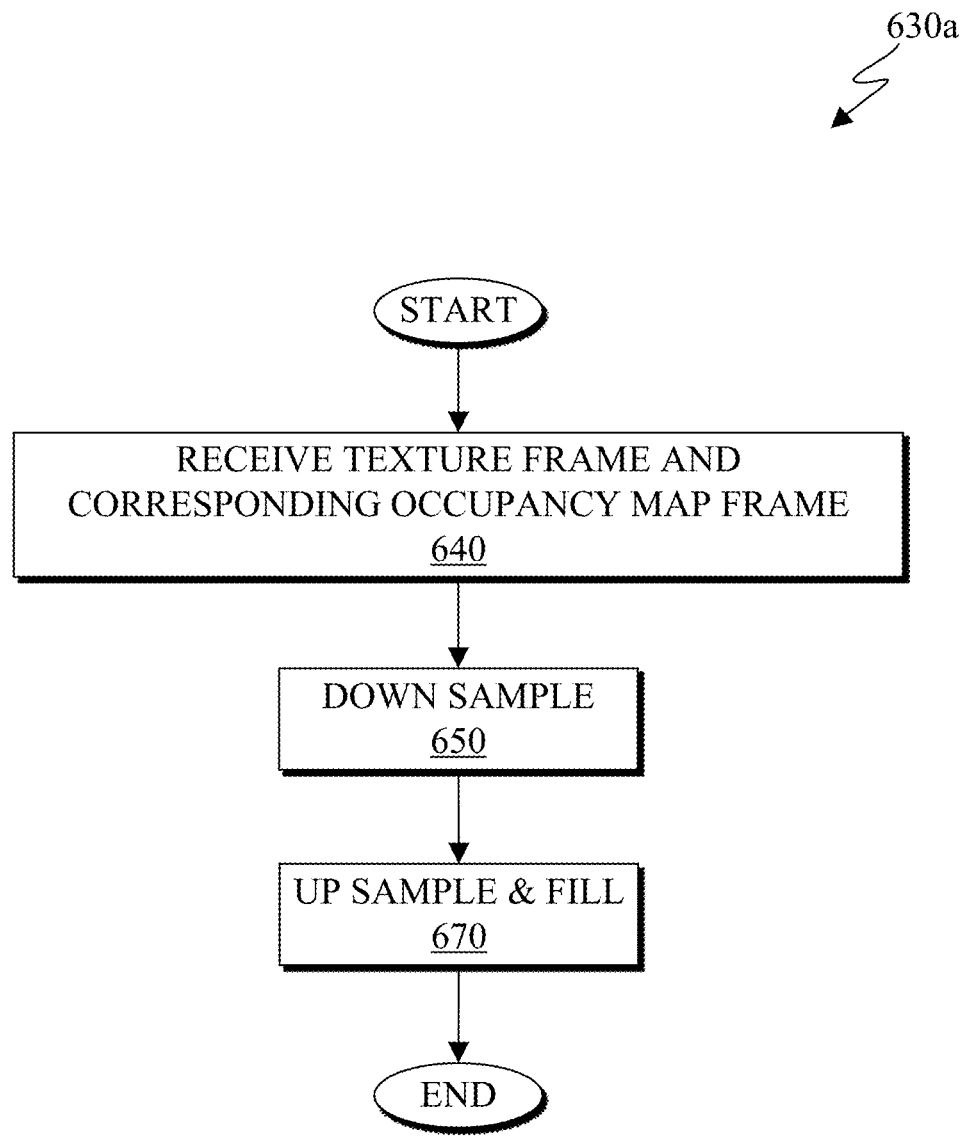
FIG. 6C illustrates an example method for adding padding to a 2D frame representing a 3D point cloud by down sampling and up sampling the 2D frame in accordance with an embodiment of this disclosure.
Figure 6D:
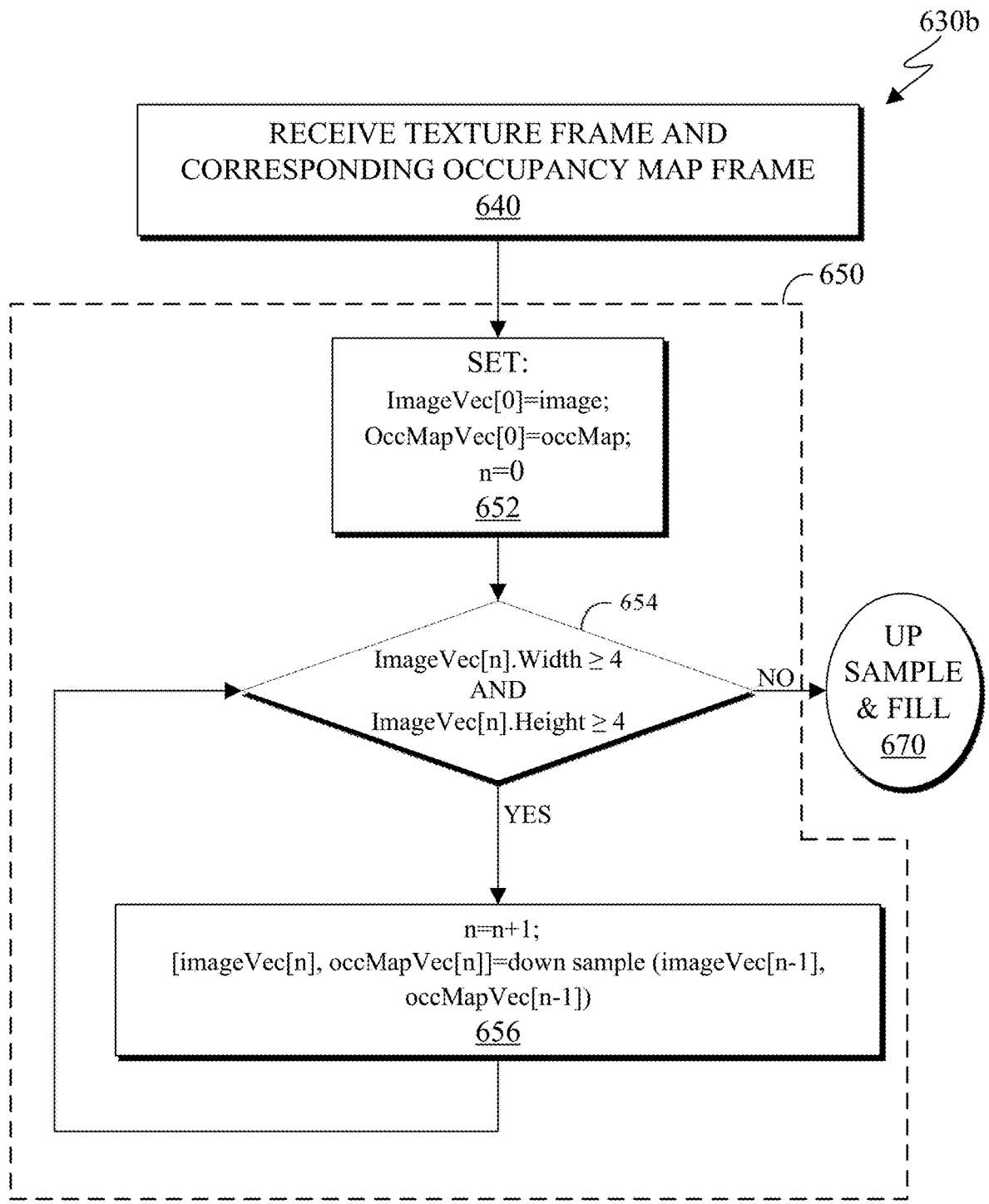
FIGS. 6D and 6E illustrate example flowchart and an example process for down sampling a 2D frame in accordance with an embodiment of this disclosure.
Figure 6E:
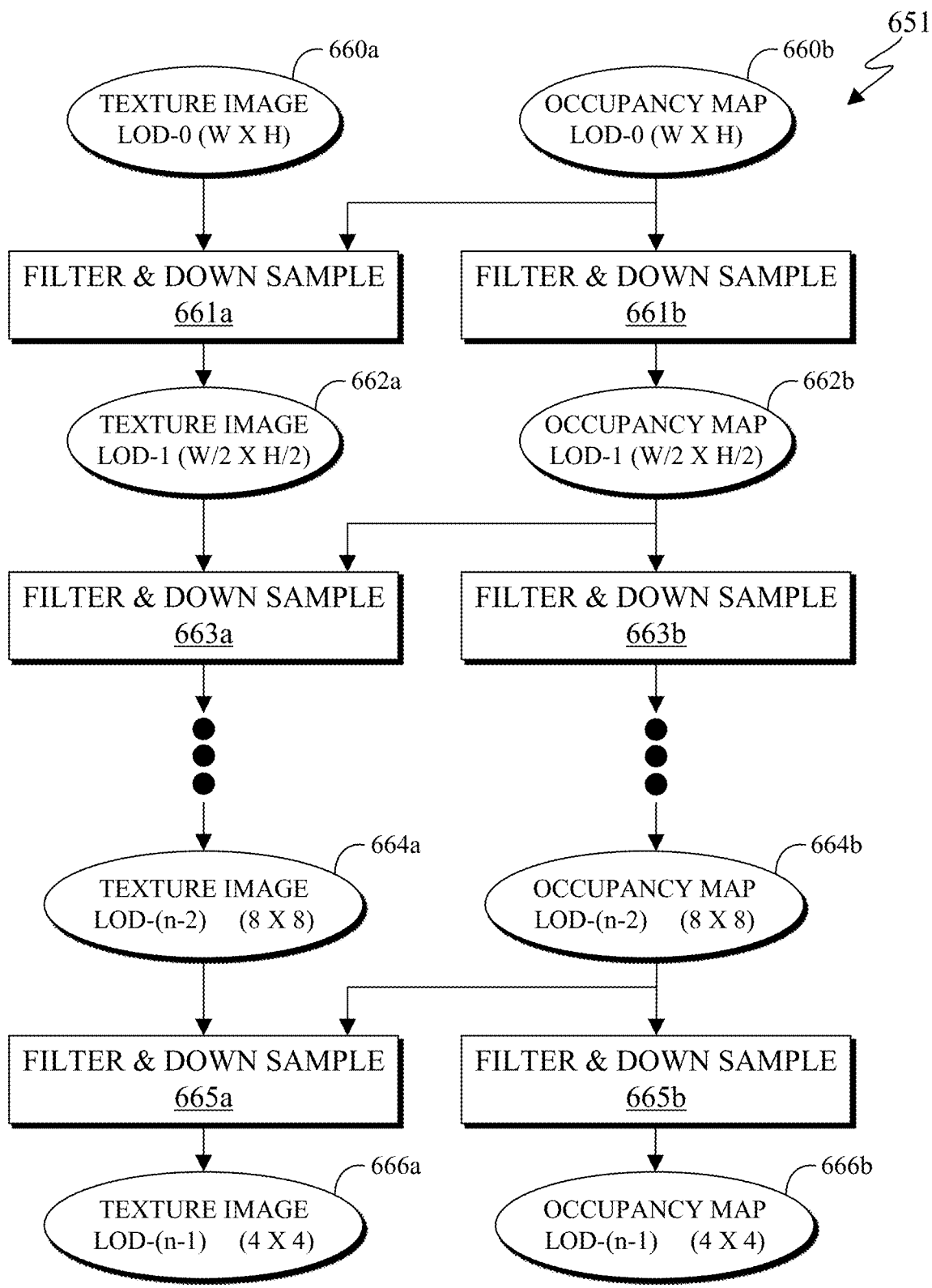
Figure 6F:
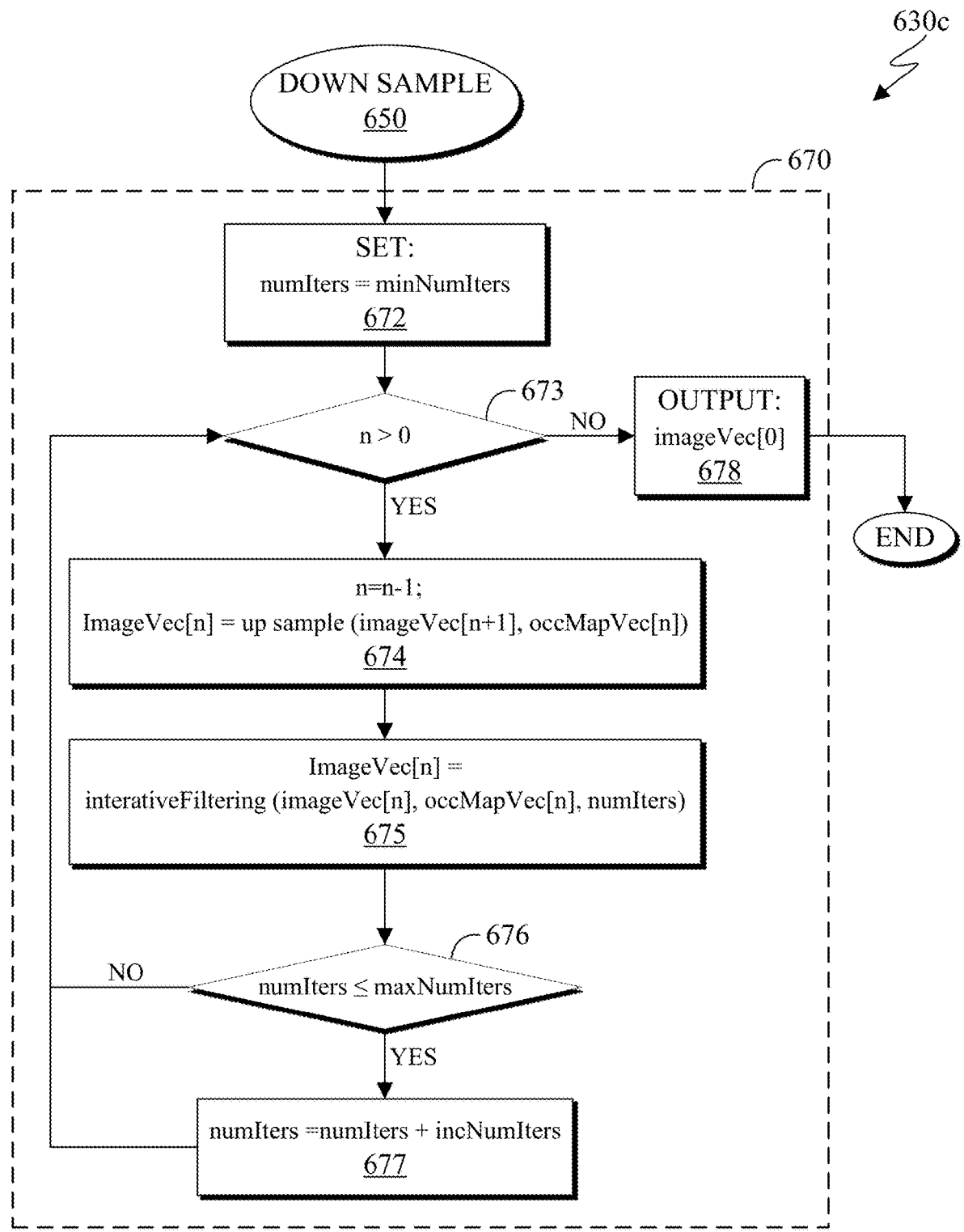
FIGS. 6F and 6G illustrate example flowchart and an example process for adding padding to a 2D frame by up sampling the 2D frame in accordance with an embodiment of this disclosure.
Figure 6G:
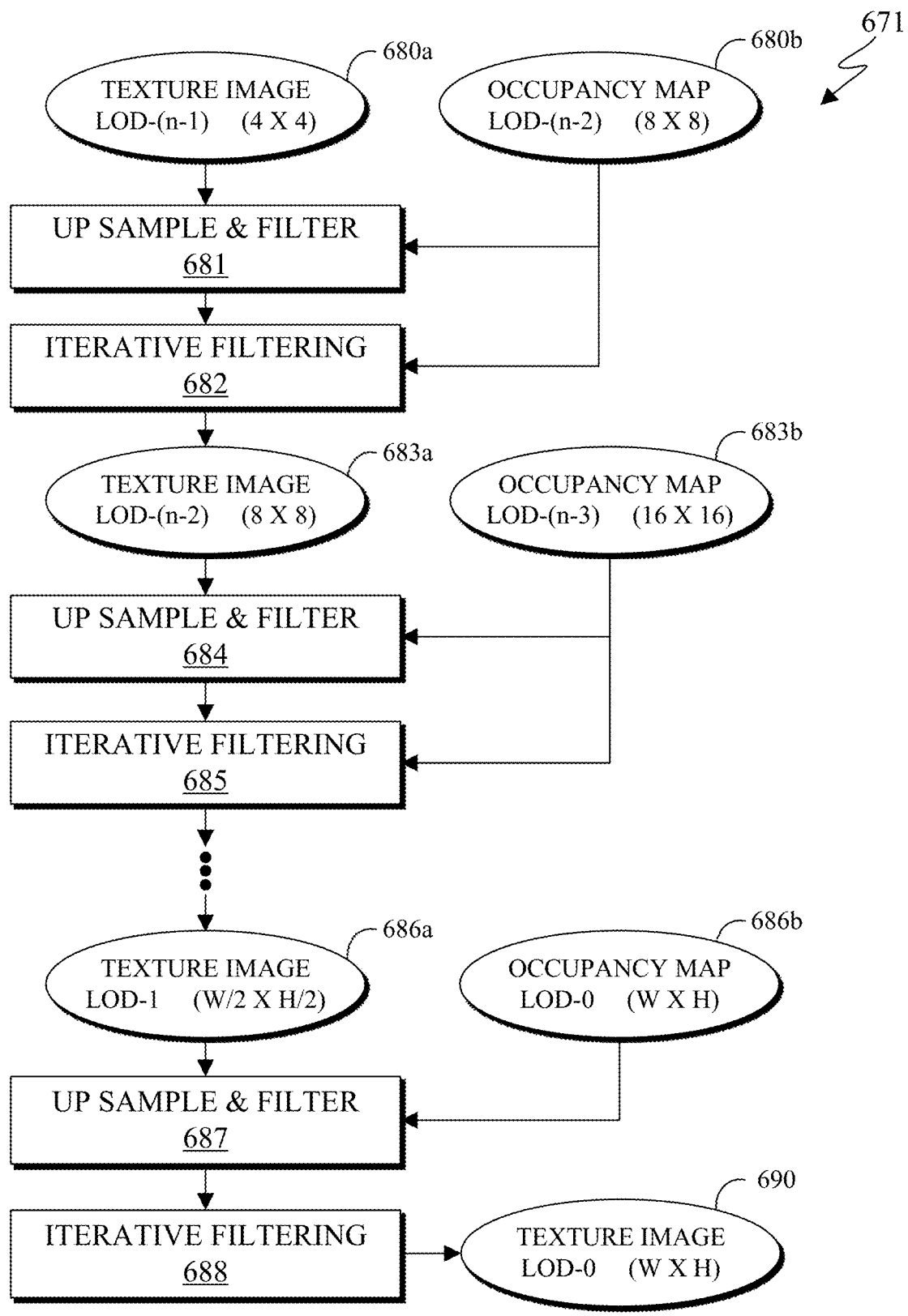

FIGS. 6A-6F describe the process of adding padding to the attribute frames 520 of FIG. 5B that correspond to color (or texture) of the point cloud 512. For example, FIGS. 6A and 6B illustrate example diagrams 600 and 610 for adding padding to a 2D frame representing a 3D point cloud by down sampling and up sampling the 2D frame in accordance with an embodiment of this disclosure. FIG. 6C illustrates an example flowchart 630*a* for adding padding to a 2D frame representing a 3D point cloud by down sampling and up sampling the 2D frame in accordance with an embodiment of this disclosure. FIG. 6D illustrates an example flowchart 630*b* for down sampling a 2D frame in accordance with an embodiment of this disclosure. FIG. 6E illustrates an example process 651 for down sampling a 2D frame in accordance with an embodiment of this disclosure. FIG. 6F illustrates an example flowchart 630*c* for adding padding to a 2D frame by up sampling the 2D frame in accordance with an embodiment of this disclosure. FIG. 6G illustrates an example process 671 for adding padding to a 2D frame by up sampling the 2D frame in accordance with an embodiment of this disclosure. The embodiment of FIGS. 6A-6G are for illustration only and other embodiments could be used without departing from the scope of this disclosure.

The diagram 600 describes the multiple LoDs that correspond to the number of sequential steps. During the down sampling 602, the resolution of the original LoD is incrementally reduced until the predetermined size is reached. After the resolution reaches the predetermined size, the padding engine 524 of FIG. 5B incrementally up samples 604 the frames until the original size is reached. In certain embodiments, the frames pass through the same resolution at each LoD during the down sampling 602 and the up sampling 604.

The diagram 610 illustrates the padding engine 524 of FIG. 5B down sampling a frame that includes the attribute of color over multiple steps until the predetermined size is reached. After the predetermined size is reached the padding engine 524 up samples the frame and adds padding to modify some pixels in the attribute frame. For example, the frame 612 is similar to the frame 420 of FIG. 4C and the frame 626 is similar to the frame 430 of FIG. 4D.

The frame 612 represents one of the attribute frames 520 of FIG. 5B (that specifies the color of the points of a point cloud), and the frame 420 of FIG. 4C that does not include any padding 424. The padding engine 524 reduces the resolution of the frame 612 over a number of sequential steps. As illustrated in the diagram 610, the padding engine 524 uses three sequential steps to down sample the resolution of the frame 612. During the first step, the padding engine 524 down samples the frame 612 to generate the frame 614. During the second step, the padding engine 524 down samples the frame 614 to generate the frame 616. During the third step, the padding engine 524 down samples the frame 616 to generate the frame 620. The frame 620 is the predetermined size. In certain embodiments, the frame 620 has a resolution that is less than or equal to four pixels in height and four pixels in width.

After the padding engine 524 incrementally reduces the resolution of the frame 612 to the predetermined size, the padding engine 524 then increases the frame 620 over a number of sequential steps until the original resolution is obtained. In certain embodiments, the padding engine 524 then increases the frame 620 over the same number of sequential steps that were used to down sample the frame 612.

During the first step, the padding engine 524 up samples the frame 620 to generate the frame 622 and adds pixels (padding) in the inter-patch space of the frame 622. Smoothing (multiple iterations of filtering) is applied to the added pixels. The added pixels do not represent points of the 3D point cloud, as indicated by the occupancy map frame 522, at the same LoD. During the second step, the padding engine 524 up samples the frame 622 to generate the frame 624 and adds pixels (padding) in the inter-patch space of the frame 624. After the padding engine 524 performs the second iteration of up sampling, the padding engine 524 performs smoothing (multiple iterations of filtering) to the added (invalid) pixels in the frame 624. The smoothing is applied to the pixels that do not represent points of the 3D point cloud, as indicated by the occupancy map frame 522, at the same LoD. During the third step, the padding engine 524 up samples the frame 624 to generate the frame 626 and adds pixels (padding) in the inter-patch space of the frame 626. After the padding engine 524 performs the third iteration of up sampling, the padding engine 524 performs smoothing (multiple iterations of filtering) to the (invalid) pixels in the frame 626. The smoothing is applied to the pixels that do not represent points of the 3D point cloud, as indicated by the occupancy map frame 522, at the same LoD. The process of up sampling, adding padding, and smoothing the pixels that do not represent points of the 3D point cloud generates a smooth padding in the inter-patch space of the frame 626.

FIG. 6C illustrates the example flowchart 630*a*. The flowchart 630*a* is the overall process of adding padding to a 2D frame representing a 3D point cloud by down sampling and then up sampling the 2D frame. The flowchart 630*b* of FIG. 6D illustrates the process of down sampling a 2D, while the flowchart 630*c* of FIG. 6F illustrates the process for adding padding to a 2D frame by up sampling the 2D frame. The flowchart 630*b* for down sampling a 2D frame is described in greater detail in the process 651 of FIG. 6E. Similarly, the flowchart 630*c* for adding padding to a 2D frame by up sampling the 2D frame is described in greater detail in the process 671 of FIG. 6G.

The flowcharts 630*a*-630*c* and the processes 651 and 671, can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the flowcharts 630*a*-630*c* and the processes 651 and 671 are described as being performed by the encoder 510 of FIGS. 5A and 5B.

The flowchart 630*a* describes the overall process of adding padding to a 2D frame representing a 3D point cloud. In step 640, the encoder 510 receives a texture (or color) frame and a corresponding occupancy map frame. In certain embodiments, the encoder 510 selects a texture frame and a corresponding occupancy map frame. The texture frame can be any of the attribute frames 520 (such as an attribute frame that specifies the color of the geometry points) of FIG. 5B and the occupancy map frame can be similar to any of the occupancy map frames 522 of FIG. 5B. The received texture frame and the corresponding occupancy map frame represent the original frames generated by the frame packing 516 of FIG. 5B.

In step 650 the padding engine 524 down samples the texture frame and a corresponding occupancy map frame over a number of sequential steps. The padding engine 524 performs the down sampling incrementally. For example, the padding engine 524 performs a down sampling to the original texture frame and a corresponding occupancy map frame in both height and width. After the first down sampling step, the padding engine 524 down samples the previous down sampled frames. The padding engine 524 continues incrementally down sample both the texture frame and a corresponding occupancy map frame until the frames are a predetermined size. In certain embodiments, the padding engine 524 continues incrementally down sample both the texture frame and a corresponding occupancy map frame until one dimension of the frames are four pixels (in height or width) or smaller.

In certain embodiments, pixels within a block of a predefined size in the ith LoD of the texture frame are averaged together to generate one pixel in the (i+1) LoD. Similarly, in the occupancy map of the same LoD as the texture frame, for every block (that is the same size as the block in the texture frame of ith LoD), the padding engine 524 identifies whether at least one pixel corresponds to a valid pixel of the 3D point cloud. When at least one pixel within the block is a valid pixel, a valid pixel is generated for the (i+1) LoD. When no pixels within the block are a valid pixel, an invalid pixel is generated for the (i+1) LoD.

For example, in the ith LoD of the texture frame, the padding engine 524 averages the pixels within a 2×2 block and generates a single pixel for the (i+1) LoD. Similarly, in the ith LoD of the occupancy map frame, the padding engine 524 generates a valid pixel in the (i+1) LoD when any pixel in the 2×2 block is valid, or generates an invalid pixel in the (i+1) LoD when no pixels within the 2×2 block are valid.

It is noted that the block size can be any size, such as 2×2, 3×2, 3×3, 3×4, 4×4, 5×5, and the like. In certain embodiments, the block need is not a square. The block is smaller than the size of the texture frame and the corresponding occupancy map frame. In certain embodiments, the block can be different size at different LoDs.

In step 670, the padding engine 524 incrementally up samples the texture image. After each up sampling step, the padding engine 524 filters the results. For example, the i-th LoD image is used to fill the inter-patch space of the i−1 LoD image using the i−1 LoD occupancy map. After filling the inter-patch space of the i−1 LoD image, the padding engine 524 filters the inter-patch space one or more iterations. Using the LoD and occupancy map images, the filtering fills the inter-patch space of the image at the first LoD (original projected image).

After the texture frame reaches the predetermined size, the padding engine 524 up samples the texture frame. When the texture frame is up sampled a single step, the padding engine 524 filters the up sampled texture frame. The padding engine 524 performs a single instance of filtering or performs multiple iterations of the filtering. For example, a single iteration of the filtering process may not be enough to thoroughly and effectively fill the whole inter-patch space. As such filtering of the inter-patch space is repeated multiple times. After the filtering is performed, the padding engine 524 up samples the texture frame another step and then filters the resulting texture frame. The process of up sampling a single step, followed by filtering one or more iterations, repeats until the texture frame is up sampled enough times to return to its original size.

In certain embodiments, the filtering is repeated using a fixed number of iterations for each LoD. For example, after each LoD is up sampled, the padding engine 524 filters the newly generated LoD a predefined number of times. In certain embodiments, the number of iterations for filtering increases at each LoD.

In certain embodiments, the padding engine 524 controls the number of filtering iterations at each LoD. For example, the padding engine 524 can set the number of iterations to eight for all LoDs. For another example, the padding engine 524 sets the number of iterations to four at the lowest LoD and increase the number of iterations by one at each subsequent LoD up until a predetermined number of iterations is performed, such as 8 iterations, 16 iterations, and the like, at the highest LoD.

In certain embodiments, the padding engine 524 can also change the filter size. For example, the padding engine 524 can increase the filter size at each larger LoD.

In certain embodiments, the padding engine 524 determines at a particular LoD the number of iterations for filtering based on the residual error. For example, the padding engine 524 identifies the residual error between images of the current and previous iterations. The padding engine 524 then compares the identified residual error to a threshold. The padding engine 524 performs no additional iterations when the residual becomes smaller than the threshold. For example, when the residual becomes is larger than the threshold, the padding engine 524 performs another iteration of filtering and then re-identifies the residual error.

FIG. 6D illustrates the flowchart 630b for down sampling the texture image and the occupancy map frame. As described above, in step 640, the encoder 510 receives a texture frame and a corresponding occupancy map frame. The texture frame can be similar to any of the attribute frames 520 of FIG. 5B (such as a frame that specifies color) and the occupancy map frame can be similar to any of the occupancy map frames 522 of FIG. 5B. The received texture frame and the corresponding occupancy map frame represent the original frames generated by the frame packing 516 of FIG. 5B.

At step 650, the padding engine 524 incrementally down samples the received texture frame, denoted as "image," and the corresponding occupancy map frame, denoted as "occMap." In certain embodiments, the padding engine 524 generates various parameters such as "iniNumIters," "incNumIters," and "maxNumIters." At step 652, the padding engine 524 sets the image to ImageVec[0] and the occMap to occMapVec[0] and sets the variable "n" to zero. The variable "n" represents the number of steps (number of LoDs that are created) that are used to down sample the received texture frame and corresponding occupancy map frame to the predetermined size.

At step 654, the padding engine 524 inspects the size of the ImageVec[n] in both height and width to determine whether the texture frame is smaller than or equal to the predetermined size. For example, the padding engine 524 compares the width of the imageVec[n] to the predetermined size and the height of the imageVec [n] to the predetermined size. As illustrated, the predetermined size is set to four, however other sizes can be used. In certain embodiments, the predetermined size can be a height that differs from the width. For example, the predetermined size can be based on the aspect ratio of the original texture frame.

When the padding engine 524 determines that the texture frame is larger than the predetermined size, then in step 656 the variable, "n" is increased by one and the imageVec[n] and the occMapVec[n] are down sampled using the texture frame and occupancy map frame of the higher LoD.

After down sampling the texture frame and occupancy map frame, the padding engine 524 again determines, in step 654 whether the texture frame is smaller than or equal to the predetermined size, in both height and width. This process of steps 654 and 656 corresponds to reducing the resolution of the texture frame and the occupancy map frame over a number of sequential steps until the size of the texture frame corresponds to the predetermined size.

After determining that the texture frame and the corresponding occupancy map frame are equal to or smaller than the predetermined size, in height and width, then the padding engine 524 determines that the texture frame and the corresponding occupancy map frame can be up sampled to fill in the inter-patch spaces in step 670. In certain embodiments, the padding engine 524 determines that the texture frame and the corresponding occupancy map frame can be up sampled to fill in the inter-patch spaces in step 670 after determining that the height or the width of the texture frame and the corresponding occupancy map frame is equal to or smaller than the predetermined size. FIG. 6F, below, illustrates the flowchart 630c for up sampling and filling the inter-patch spaces.

FIG. 6E illustrates the process 651 describing the step 650 of FIGS. 6C and 6D. The process 651 can be performed by the padding engine 524 of FIG. 5B. A texture image 660a and a corresponding occupancy map 660b are selected for down sampling. The texture image 660a represents the original LoD, such as LoD-0 which has an original width and height. Similarly, the occupancy map 660b represents the original LoD, such as LoD-0 which has an original width and height.

In step 661a, the padding engine 524 down samples the texture image 660a to generate the texture image 662a. The texture image 662a represents a single step that resolution of the texture image 660a is reduced. The LoD of the texture image 662a is the LoD-1 and has a width and height that are half of the texture image 660a. It is noted that the width and height of the texture image 662a is based on the size of the block which down samples and reduces the resolution of the texture image 660a. When the padding engine 524 down samples the texture image 660a in step 661a, the padding engine 524 uses the occupancy map 660b.

Similarly, in step 661b, the padding engine 524 down samples the occupancy map 660b to generate the occupancy map 662b. The occupancy map 662b represents a single step that resolution of the occupancy map 660b is reduced. For example, the LoD of the occupancy map 662b is the LoD-1 and has a width and height that are half of the occupancy map 660b. It is noted that the width and height of the occupancy map 662b is based on the size of the block which down samples and reduces the resolution of the texture image 660a. As illustrated, the size and width of the texture image 662a and the occupancy map 662b are the same after the respective down sampling of steps 661a and 661b.

In step 663a, the padding engine 524 down samples the texture image 662a to generate a smaller texture image. Similarly, in step 663b, the padding engine 524 down samples the occupancy map 662b to generate a smaller occupancy map. This process continues over multiple steps until the padding engine 524 down samples and reduces the resolution of the texture image and occupancy map to generate the texture image 664a and the occupancy map 664b, respectively.

The texture image 664a represents the reduced texture image 660a over multiple sequential steps instance. For example, the LoD of the texture image 664a is the LoD(n−2) which, as illustrated corresponds to a resolution that is 8×8. Similarly, the occupancy map 664b represents the reduced occupancy map 660b over multiple sequential steps instance. For example, the LoD of the occupancy map 664b is the LoD(n−2) which, as illustrated corresponds to a resolution that is 8×8.

In step 665a, the padding engine 524 down samples the texture image 664a to generate the texture image 666a. The texture image 666a represents multiple steps that the resolution of the texture image 660a is reduced. For example, the LoD of the texture image 666a is the LoD(n−1) and has a width and height that corresponds to 4 pixels. When the padding engine 524 down samples the texture image 664a in step 665a, the padding engine 524 uses the occupancy map 664b.

Similarly, in step 665b, the padding engine 524 down samples the occupancy map 664b to generate the occupancy map 666b. The occupancy map 666b represents multiple steps that the resolution of the occupancy map 660b is reduced. For example, the LoD of the occupancy map 666b is the LoD(n−1) and has a width and height that corresponds to 4 pixels. As illustrated, the size and width of the texture image 666a and the occupancy map 666b are the same after the respective down sampling of steps 661a and 661b. The size of the texture image 666a and the occupancy map 666b represents the predetermined size.

FIG. 6F illustrates the flowchart 630c for up sampling the texture frame and the corresponding occupancy map and fills in pixels the inter-patch spaces at step 670. That is, after the padding engine 524 decreases the resolution of both the texture frame and the corresponding occupancy map frame to a predetermined size in step 650, the padding engine 524 in step 670 increases the resolution by up sampling both the texture frame and the corresponding occupancy map over multiple steps. Additionally, in step 670 the padding engine 524 filters the results after each incremental up sampling.

In step 672, the padding engine 524 sets the expression "numIters" to "minNumIters." When the expression "numIters" is set to "minNumIters" sets the expression "numIters" to smallest number of intervals that the filtering is performed on the smallest LoD.

In step 673, the padding engine 524 determines whether "n" is greater than zero. For example, during step 656 of FIG. 6D, the variable "n" is incrementally increased, which indicates the number of steps that the texture frame and the corresponding occupancy map are down sampled. When "n" is greater than zero indicates that the texture frame and the corresponding occupancy map are not the original size.

After determining that the texture frame and the corresponding occupancy map are not the original size (based on the value of "n") the padding engine 524 decreases the value of "n" by one and up samples texture image and the corresponding occupancy map. For example, the imageVec[n] is up sampled based on the imageVec[n+1] and the occMapVec[n]. That is, the texture image of the previous LoD is up sampled based on the occupancy map of the current LoD.

In step 675, the padding engine 524 performs one or more filtering iterations to the up sampled LoD. For example, the imageVec[n] (which was generated in step 674) is filtered over multiple iterations. The filtering of the texture image is dependent on the occupancy map.

The number of iterations that the filtering is performed is based on the expression "numIters." After performing the number of filtering iterations indicated by the expression "numIters," the padding engine 524 determines whether the number of iterations is less than the previously predefined, denoted as "maxNumIters." The expression "maxNumIters" corresponds to the maximum number of iterations. In certain embodiments, "maxNumIters" is sixteen.

In step 676, the padding engine 524 determines whether the value of the expression "numIters" is less than the value of the expression "maxNumIters." When the value of the expression "numIters" is less than or equal to the value of the expression "maxNumIters," then in step 677 the padding engine 524 increases the expression "numIters." Thereafter the flowchart 630c returns to step 673. Alternately, when the number of iterations is greater than the maximum number of iterations, the flowchart 630c returns to step 673 (skipping step 677). After returning to step 673 the padding engine 524 determines whether "n" is greater than zero. As the variable "n" decreases in step 674, the padding engine 524 determines whether to output the texture frame with the added padding in step 678 or continue up sampling the current LoD and add in additional padding.

FIG. 6G illustrates the process 671 describing the step 670 of FIGS. 6C and 6F. The process 671 can be performed by the padding engine 524 of FIG. 5B. The padding engine 524 up samples the texture frame using the occupancy map that corresponds to a LoD higher than the texture frame, until the resolution of the texture frame is the original resolution.

The texture image 680a is similar to the texture image 666a of FIG. 6E. For example, both the texture image 680a and the texture image 666a correspond to the same LoD, that of LoD(n−1) and have a similar width and height 4×4. That is, the texture image 680a and the texture image 666a correspond to the predetermined size.

To up sample the texture image 680a, the padding engine 524 uses the occupancy map 680b. The occupancy map 680b is similar to the occupancy map 664b. Both the occupancy map 680b and the occupancy map 664b correspond to the same LoD, that of LoD(n−2) and have a similar width and height, 8×8.

In step 681, the padding engine 524 up samples and filters the texture image 680a. In certain embodiments, the filtering is a 4-tap filter. In step 682, the padding engine 524 then performs the iterative filtering. After up sampling the texture image 680a, the padding engine 524 uses the occupancy map 680b to filter the invalid pixels in the texture image 680a. The invalid pixels correspond to the pixels in the inter-patch space. The padding engine 524 performs multiple iterations of filtering to smooth the invalid pixels of the texture image 680a.

After the last iteration of filtering is complete, the texture image 683a is generated. The texture image 683a is similar to the texture image 664a of FIG. 6E. For example, both the texture image 683a and the texture image 664a correspond to the same LoD, that of LoD(n−2) and have a similar width and height 8×8.

To up sample the texture image 683a, the padding engine 524 uses the occupancy map 683b. The occupancy map 683b which corresponds to a LoD higher than that of the texture image 683a. In particular, the LoD of the occupancy map 683b is (n−3) while the LoD of the texture frame to be up sampled is (n−2).

In step 684, the padding engine 524 up samples and filtering of the texture image 683a using the occupancy map 683b. In certain embodiments, the filtering is a 4-tap filter. In step 685, the padding engine 524 then performs the iterative filtering. After up sampling the texture image 683a, the padding engine 524 uses the occupancy map 683b to filter the invalid pixels in the texture image 683a. The invalid pixels correspond to the pixels in the inter-patch space. The padding engine 524 performs multiple iterations of filtering to smooth the invalid pixels of the texture image 680a.

The process continues until the texture image 686a is generated. The texture image 686a is similar to the texture image 662a of FIG. 6E. For example, both the texture image 686a and the texture image 662a correspond to the same LoD, that of LoD-1 and have a similar width and height.

To up sample the texture image 686a, the padding engine 524 uses the occupancy map 686b which corresponds to a LoD higher than that of the texture image 686a. In particular, the LoD of the occupancy map 686b is the original LoD, while the LoD of the texture frame to be up sampled is LoD-1. The occupancy map 686b is similar to the occupancy map 660b of FIG. 6E. Both the occupancy map 686b and the occupancy map 660b correspond to the same LoD, that of the original LoD and have a similar width and height.

In step 687, the padding engine 524 up samples and filters the texture image 687a using the occupancy map 686b. In certain embodiments, the filtering is a 4-tap filter. In step 688, the padding engine 524 then performs the iterative filtering. After up sampling the texture image 686a, the padding engine 524 uses the occupancy map 686b to filter the invalid pixels in the texture image 686a. The invalid pixels correspond to the pixels in the inter-patch space. The padding engine 524 performs multiple iterations of filtering to smooth the invalid pixels of the texture image 680a.

After the last iteration of filtering is complete, the texture image 690 is generated. The texture image 690 is of a similar resolution similar to the texture image 660a of FIG. 6E, but includes padding in the inter-patch space. Both the texture image 683a and the texture image 664a correspond to the same LoD and have a similar width and height 8×8.

Although FIGS. 6C-6G illustrates one example of for point adding padding to a frame, various changes may be made to FIGS. 6C-6G. For example, while shown as a series of steps, various steps in FIGS. 6C-6G could overlap, occur in parallel, or occur any number of times.

Figure 7A:
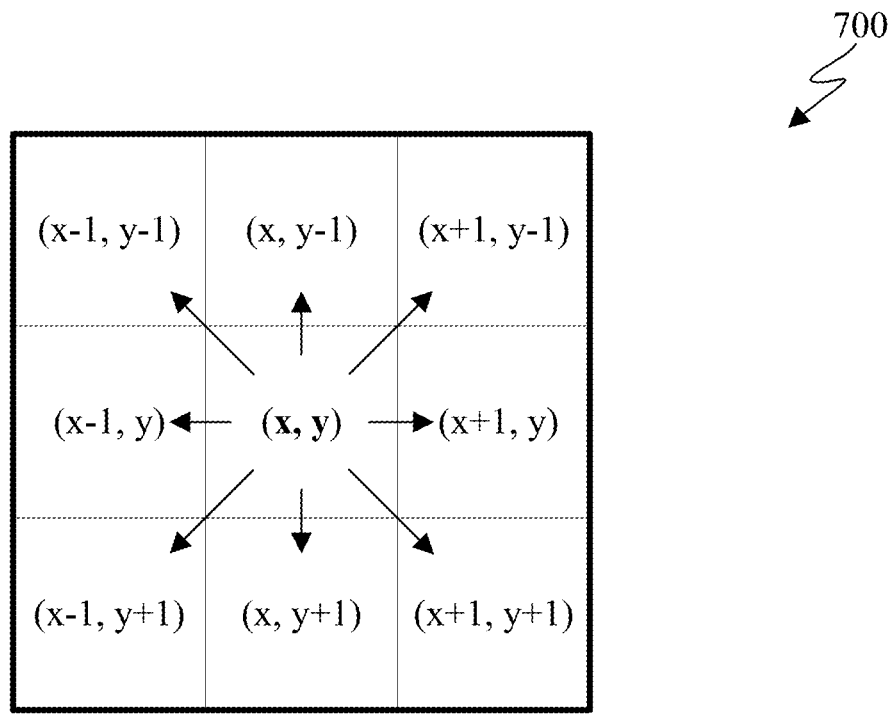
FIGS. 7A, 7B, 7C, 7D, 7E, and 7F illustrate example filters for smoothing the 2D frame at different levels of detail in accordance with an embodiment of this disclosure.
Figure 7B:
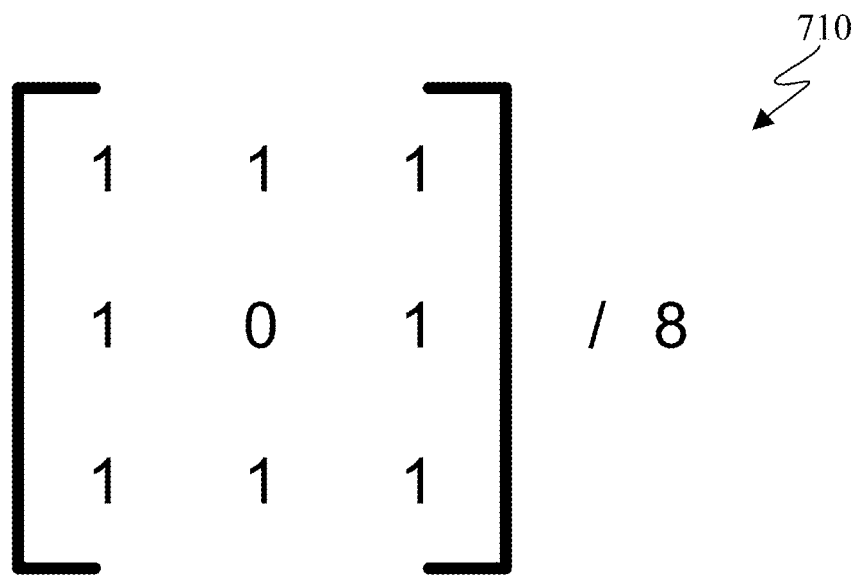
Figure 7C:
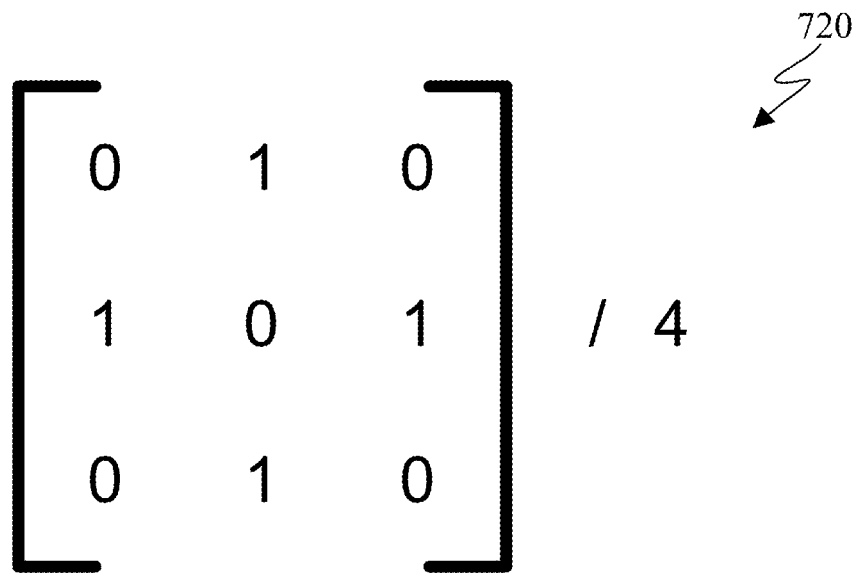
Figure 7D:
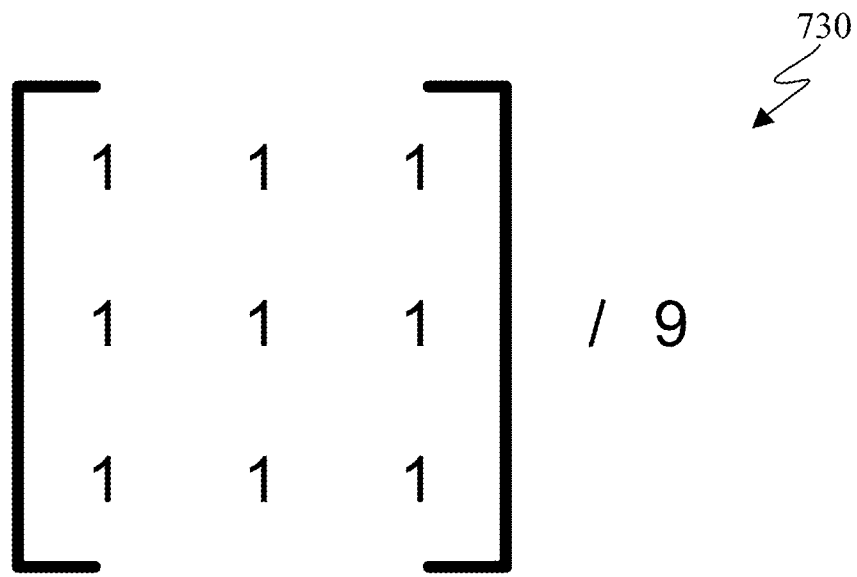
Figure 7E:
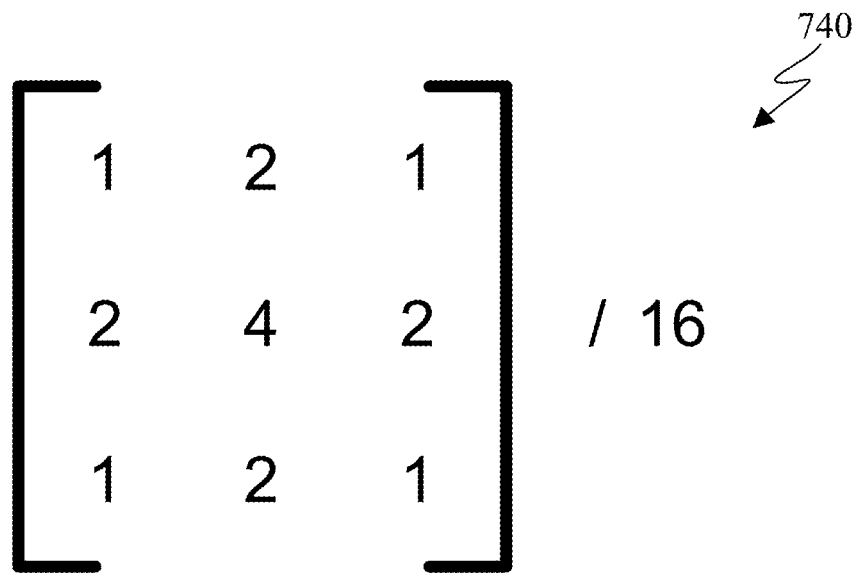
Figure 7F:
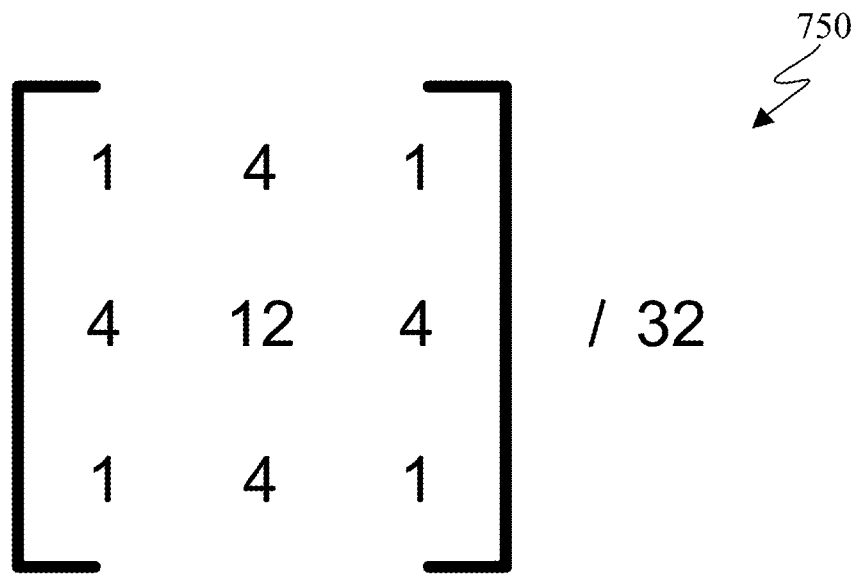

FIGS. 7A, 7B, 7C, 7D, 7E, and 7F illustrate example filters for smoothing the 2D frame at different levels of detail in accordance with an embodiment of this disclosure. In particular, the FIG. 7A illustrates 8-tap filter 700. FIG. 7B illustrates 8-tap filter 710. FIG. 7C illustrates a 4-tap filter 720. FIGS. 7D, 7E, and 7F illustrate various 9 tap filters 730, 740, and 750, respectively. The filters 710-750 are for example filters with other sizes and weights can be implemented as well.

Equation (1) describes how the encoder 510 applies an 8-tap filter, similar to the filter 700 and 710. For example, Equation (1) describes applying the filter 710 at each iteration to the c-th color channel of a pixel located in the inter-patch space at the (x,y) position.

$$\text{image}(x, y, c) = \\ (\text{image}(x-1, y-1, c) + \text{image}(x+1, y-1, c) + \\ \text{image}(x-1, y+1, c) + \text{image}(x+1, y+1, c) + \\ \text{image}(x, y-1, c) + \text{image}(x, y+1, c) + \\ \text{image}(x-1, y, c) + \text{image}(x+1, y, c) + 4) \gg 3$$

Equation (1)

Syntax (1) below describes the process of using a sample 8-tap filter described in Equation (1). In Syntax (1) the term "imageLowerLod" corresponds to the image of the lower LoD. The term "occupancyMapLod" corresponds to the occupancy map of the current LoD. The term "numItersLod" corresponds to the number of iterations for the current LoD. The term "smoothingFilterLod" corresponds to the smoothing filter used for the current LoD. The term "imageLod" corresponds to the image of the current LoD.

Syntax                                                                 (1)
```
imageLod = pullPushFill( imageLowerLod, occupancyMapLod,
numItersLod)
{
// Apply upsampling and filtering.
imageLod = upsample(imageLowerLod, occupancyMapLod);
// Apply the iterative filtering operation
tempImage = imageLod; // temporary image buffer
for (n = 1 to numItersLod) {
    for (y = 0 to height−1) {
        for (x = 0 to width−1) {
            if (occupancyMapLod(x,y) == 0) {
                for (c = 1 to 3) { // assuming 3 color channels
                    tempImage(x,y,c) = (imageLod(x−1,y−1,c) +
                                        imageLod(x+1,y−1,c) +
                                        imageLod(x−1,y+1,c) +
                                        imageLod(x+1,y+1,c) +
                                        imageLod(x,y−1,c) +
                                        imageLod(x,y+1,c) +
                                        imageLod(x−1,y,c) +
                                        imageLod(x+1,y,c) + 4 ) >> 3;
                }
            }
        }
    }
    imageLod = tempImage;
}
}
```

Syntax (2) below describes an example of how the number of iterations in the proposed filtering process is determined for each LoD. For example, as described in Syntax (2) four iterations of filtering is implemented at the lowest LoD, and the number of iterations are increased by one at each higher LoD up to sixteen iterations of filtering is performed at the highest LoD. As shown in Syntax (2), n−1 is the index of the lowest LoD and 0 is the index of the highest LoD.

Syntax                                                                 (2)
```
numIters = 4;
for (i = n−1 to 1) {
    image[i−1] = pushPullFill(image[i], occupancyMap[i−1], numIters);
    numIters = min(numIters + 1, 16);
}
```

Embodiments of the present disclosure are not limited to the filter 700 and 710. For example, filters of different sizes and weights can be used. Filters can be symmetric or non-symmetric. The filters 720, 730, 740, and 750 illustrate example 3×3 filters.

Although FIGS. 7A, 7B, 7C, 7D, 7E, and 7F illustrate various filters, various changes may be made to FIGS. 7A, 7B, 7C, 7D, 7E, and 7F. For example, the sizes and weights of the filters can vary.

Figure 8:
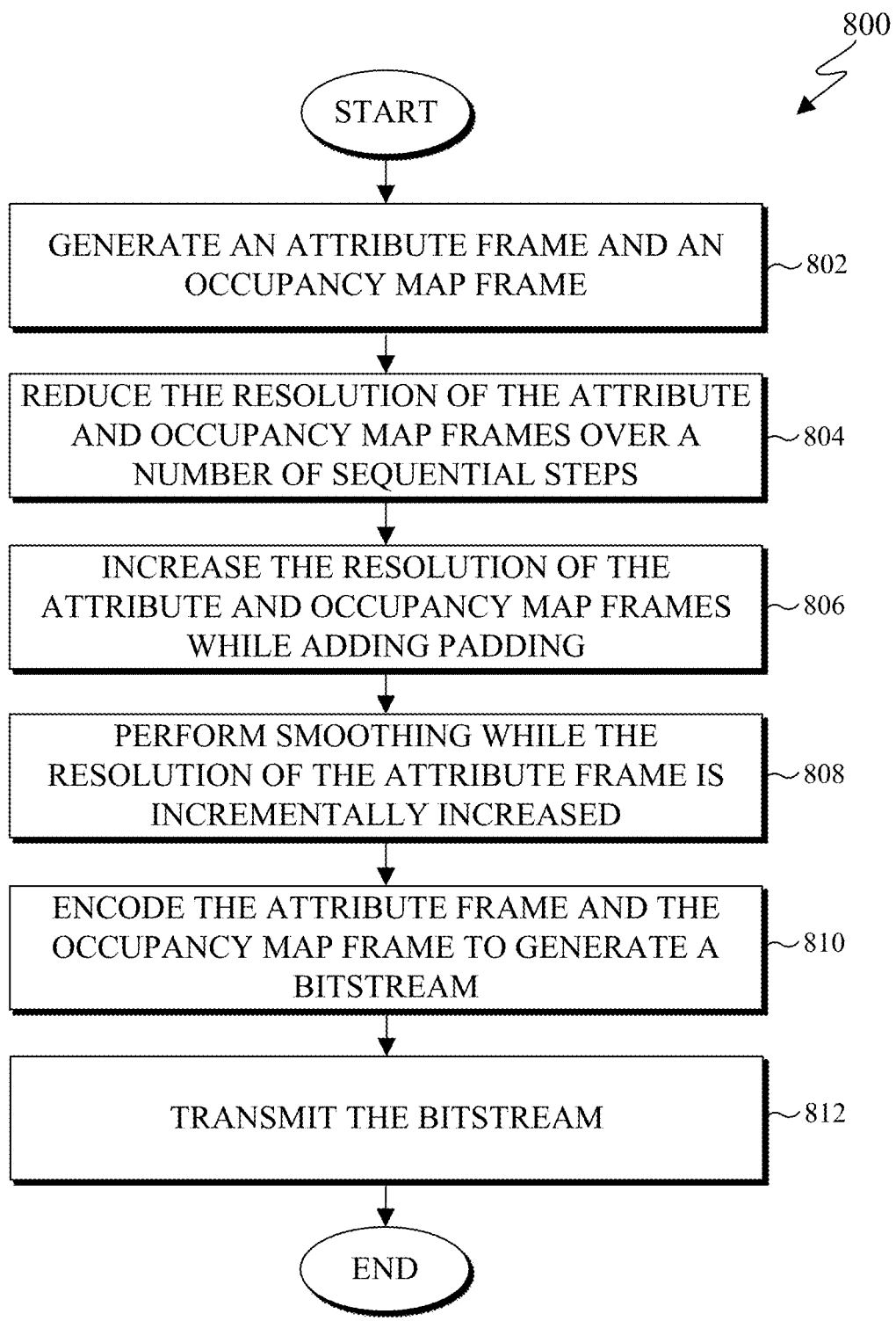
FIG. 8 illustrates example method for encoding a point cloud in accordance with an embodiment of this disclosure.

FIG. 8 illustrates example method 800 for encoding a point cloud in accordance with an embodiment of this disclosure. The method 800 can be performed by the server 104 or any of the client devices 106-116 of FIG. 1, the server 200 of FIG. 2, the electronic device 300 of FIG. 3, the encoder 510 of FIGS. 5A and 5B, or any other suitable device or system. For ease of explanation, the method 800 is described as being performed by the encoder 510 of FIGS. 5A and 5B.

In step 802, the encoder 510 generates for a 3D point cloud an attribute frame and an occupancy map frame. The attribute frame includes pixels that represent texture associated with points of a 3D point cloud. In certain embodiments, the texture is color. The occupancy map indicates which pixels in the attribute frame represent points of the 3D point cloud. The encoder can also generate additional frames such as a geometry frame, or additional texture frames.

At step 804 the encoder 510 reduces the resolution of the attribute frame and the occupancy map frame. The resolution of the attribute frame and the occupancy map frame is reduced over a number of sequential steps. The attribute frame and the occupancy map frame are reduced until they are a predetermined size. That is, the attribute frame and the occupancy map frame are down sampled in both height and width. In certain embodiments, the attribute frame and the occupancy map frame are reduced until one diminution of the attribute frame and the occupancy map frame would be four pixels or smaller.

To down sample the attribute frame the encoder 510 averages the pixels within a particular block size to generate a pixel representing a color value. In certain embodiments, to down sample the attribute frame the encoder 510 determines whether any pixel within the particular block size is valid. If a pixel in the block size is valid, then the generated pixel in the down sampled image is valid. If no pixels in the block are valid, then the generated pixel in the down sampled image is invalid. In certain embodiments, to down sample the attribute frame the encoder 510 averages the pixels within a particular block size to generate a pixel representing either a valid or invalid pixel.

At a particular LoD, the encoder 510 generates a single pixel representing the pixels within a block in the particular LoD. That single pixel is placed in the subsequent LoD. The block then shifts to the adjacent pixels at the particular LoD (pixels that were not yet averaged in the current LoD) and generates another single pixel, based on the pixels, and places that pixel in the subsequent LoD. This process continues until each pixel in at the particular LoD similarly down sampled.

In certain embodiments, the block is 2×2. In the attribute frame, every pixel within the 2×2 block of a current LoD (i LoD) is averaged to generate a single pixel. The generated pixel is placed in a smaller LoD (i+1 LoD). In particular, the 2×2 block of a current LoD (i LoD) averages and generates single pixels that correspond to a color value in the attribute frame. In the occupancy map frame, the encoder 510 determines whether any pixel is valid within the 2×2 block. When any pixel is valid within the 2×2 block, a single pixel indicating a valid pixel is generated. When no pixels within the 2×2 block are valid, then a single pixel indicating an invalid pixel is generated. The 2×2 block then moves to the adjacent four pixels at the current LoD (i LoD) and generates another single pixel. The 2×2 block continues to shift until every pixel in the current LoD (i LoD) is used to generate single pixels. Each pixel that is generated is stored at a corresponding position in the smaller LoD. This process continues generating smaller and smaller LoDs until at least one dimension (height or width) of the attribute frame and the occupancy map frame is a predetermined size, such as 4 pixels.

In certain embodiments, the size of the block can change from each LoD. For example, the size of the block decreases at each subsequent (smaller) LoD. For another example, the size of the block increases at each subsequent (smaller) LoD. It is noted that based on the size of the block, the number of steps needed to reduce the attribute frame and the occupancy map frame to the predetermined size changes. Similarly the size of the block affects the quality associated with each down sampling.

After the attribute frame and the occupancy map frame are reduced to a predetermined size, in step 806, the encoder 510 increases the resolution of the attribute frame and the occupancy map while adding padding. The resolution of the attribute frame and the occupancy map frame is increased over a number of sequential steps. The attribute frame and the occupancy map frame are increased until they are the original size. To up sample pixels in the attribute frame the encoder 510 uses the i-th LoD image to fill the inter-patch space of the i−1 LoD image using the i−1 LoD occupancy map.

After each LoD image is generated, in step 808, the encoder 510 performs an adaptive iterative filtering process to make the color, intensity, or both, in the inter-patch space as smooth as possible. That is, the iterative filtering process is applied to the pixels in the attribute frame that are identified as invalid pixels by the occupancy map frame. The smoothing increases the padding with respect to the pixels located in the inter-patch space of the attribute frame. When the number of iterations of the filtering is complete at a particular LoD, the encoder 510 up samples that LoD (i-LoD), to (i+1 LoD).

A first iteration of smoothing, at any LoD is based on the values of the pixels in the attribute frame after the resolution of the attribute frame is increased. Each subsequent filtering iteration is based on the values of the pixels of the previous filtering iteration.

Additionally, the number of iterations that the filtering is applied can be fixed or change at each subsequent LoD. In certain embodiments, the number of iterations is set to eight for all LoDs. In certain embodiments, the number of iterations is set to four at the lowest LoD and incrementally increased to a preset number of iterations at the highest LoD. For example, the number of iterations can increase to eight at the highest LoD. For example, the number of iterations can increase to sixteen at the highest LoD. For yet example, the number of iterations can increase to another predefined number of iterations at the highest LoD.

In certain embodiments, the number of iterations for filtering can be adaptively determined at each LoD based on the residual error between the attribute frame of a current iteration of filtering and the previous iteration of filtering. The encoder 510 compares the identified residual error to a threshold. The filtering stops when the residual error is less than a threshold.

The size of the filter can change between different LoDs or remain constant for every LoD. In certain embodiments, the size of the filter is a 3×3 filter for each LoD. In certain embodiments, the size of the filter increases at each subsequent LoD. Additionally, the weights applied at filter can change at different LoDs or remain constant for each LoD.

In step 810, the encoder 510 encodes the attribute frame, occupancy map frame and any other generated frames that represent the 3D point cloud. After the frames representing 3D point cloud are encoded, the encoder 510 can multiplex the frames into a bitstream. In step 812, the encoder 510 transmits the bitstream. The bitstream can be ultimately transmitted to a decoder, such as the decoder 550.

Although FIG. 8 illustrates one example of a method 800 for point cloud encoding, various changes may be made to FIG. 8. For example, while shown as a series of steps, various steps in FIG. 8 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the applicants to refer to structures known to those skilled in the relevant art and is not intended to invoke 35 U.S.C. § 112(f).

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An encoding device for point cloud encoding, the encoding device comprising:
   a processor configured to:
     generate, for a three-dimensional (3D) point cloud, an attribute frame that includes pixels and an occupancy map frame that identifies which of the pixels in the attribute frame represent points of the 3D point cloud,
     reduce a resolution of the attribute frame and a resolution of the occupancy map frame over a number of sequential steps, until the attribute frame and the occupancy map frame are a predetermined size,
     after the attribute frame and the occupancy map frame are reduced to the predetermined size, increase the resolution of the attribute frame and the resolution of the occupancy map frame over the number of sequential steps while adding padding to modify at least some of the pixels in the attribute frame that do not represent points of the 3D point cloud,
     while the resolution of the attribute frame is incrementally increased, perform smoothing on the pixels in the attribute frame that do not represent the points of the 3D point cloud,
     encode the attribute frame and the occupancy map frame to generate a bitstream; and
   a communication interface operably coupled to the processor, the communication interface configured to transmit the bitstream.

2. The encoding device of claim 1, wherein the processor is further configured to:
   identify, at each of the sequential steps, the pixels to smooth in the attribute frame based on the occupancy map frame at the same step as the attribute frame,
   wherein smoothing increases the padding with respect to the pixels in the attribute frame that do not represent points of the 3D point cloud.

3. The encoding device of claim 1, wherein:
   the processor is further configured to perform the smoothing a number of iterations at each of the sequential steps,
   a first iteration of the smoothing, at each of the sequential steps, is based on values of the pixels in the attribute frame after the resolution of the attribute frame is increased, and
   each subsequent iteration of smoothing, after the first iteration at a current step, is based on values of the pixels corresponding to one previous iteration of smoothing.

4. The encoding device of claim 3, wherein after performing an iteration of the smoothing, the processor is configured to:
   identify a residual error between the attribute frame prior to performing the iteration of the smoothing and the attribute frame after performing the iteration of the smoothing; and
   determine to perform an additional iteration of smoothing to the pixels in the attribute frame based on comparing the residual error to a threshold, wherein the number of iterations that the smoothing is performed is based on the residual error.

5. The encoding device of claim 3, wherein the processor is further configured to increase the number of iterations that the smoothing is performed incrementally for each subsequent step of the number of sequential steps.

6. The encoding device of claim 5, wherein:
   smoothing is performed in four iterations during one of the sequential steps when the attribute frame is the predetermined size; and
   the processor is configured to increase the number of iterations that the smoothing is performed incrementally for each subsequent step of the number of sequential steps up to sixteen iterations.

7. The encoding device of claim 1, wherein:
   the smoothing is performed using a filter; and
   the processor is configured to increase a size of the filter at each subsequent step of the number of sequential steps.

8. The encoding device of claim 7, wherein the filter is a 3x3 filter at each subsequent step of the number of sequential steps.

9. The encoding device of claim 1, wherein the processor is configured to perform the smoothing using an 8-tap filter, defined as:

$$\begin{bmatrix} 1 & 1 & 1 \\ 1 & 0 & 1 \\ 1 & 1 & 1 \end{bmatrix} /8.$$

10. The encoding device of claim 1, wherein:
the smoothing is performed using a filter; and
the processor is configured to change weights of the filter at each subsequent step of the number of sequential steps.

11. A method for point cloud encoding comprising:
generating, for a three-dimensional (3D) point cloud, an attribute frame that includes pixels and an occupancy map frame that identifies which of the pixels in the attribute frame represent points of the 3D point cloud;
reducing a resolution of the attribute frame and a resolution of the occupancy map frame over a number of sequential steps, until the attribute frame and the occupancy map frame are a predetermined size;
after the attribute frame and the occupancy map frame are reduced to the predetermined size, increasing the resolution of the attribute frame and the resolution of the occupancy map frame over the number of sequential steps while adding padding to modify at least some of the pixels in the attribute frame that do not represent points of the 3D point cloud;
while the resolution of the attribute frame is incrementally increased, performing smoothing on the pixels in the attribute frame that do not represent the points of the 3D point cloud;
encoding the attribute frame and the occupancy map frame to generate a bitstream; and
transmitting the bitstream.

12. The method of claim 11, further comprising:
identifying, at each of the sequential steps, the pixels to smooth in the attribute frame based on the occupancy map frame at the same step as the attribute frame,
wherein smoothing increases the padding with respect to the pixels in the attribute frame that do not represent points of the 3D point cloud.

13. The method of claim 11, further comprising performing the smoothing a number of iterations at each of the sequential steps,
wherein:
a first iteration of the smoothing, at each of the sequential steps, is based on values of the pixels in the attribute frame after the resolution of the attribute frame is increased, and
each subsequent iteration of smoothing, after the first iteration at a current step, is based on values of the pixels corresponding to one previous iteration of smoothing.

14. The method of claim 13, further comprising:
after performing an iteration of the smoothing, identifying a residual error between the attribute frame prior to performing the iteration of the smoothing and the attribute frame after performing the iteration of the smoothing, and
determining to perform an additional iteration of smoothing to the pixels in the attribute frame based on comparing the residual error to a threshold, wherein the number of iterations that the smoothing is performed is based on the residual error.

15. The method of claim 13, further comprising increasing the number of iterations that the smoothing is performed incrementally for each subsequent step of the number of sequential steps.

16. The method of claim 15, wherein:
smoothing is performed in four iterations during one of the sequential steps when the attribute frame is the predetermined size; and
the method further comprises increasing the number of iterations that the smoothing is performed incrementally for each subsequent step of the number of sequential steps up to sixteen iterations.

17. The method of claim 11, wherein:
the smoothing is performed using a filter; and
the method further comprises increasing a size of the filter at each subsequent step of the number of sequential steps.

18. The method of claim 17, wherein the filter is a 3x3 filter at each subsequent step of the number of sequential steps.

19. The method of claim 11, wherein the smoothing is performed using an 8-tap filter, defined as:

$$\begin{bmatrix} 1 & 1 & 1 \\ 1 & 0 & 1 \\ 1 & 1 & 1 \end{bmatrix}/8.$$

20. The method of claim 11, wherein:
the smoothing is performed using a filter; and
the method further comprises changing weights of the filter at each subsequent step of the number of sequential steps.

* * * * *